(12) United States Patent
Friedel et al.

(10) Patent No.: US 9,233,806 B2
(45) Date of Patent: Jan. 12, 2016

(54) METHODS AND APPARATUS TO RECEIVE AND DISCHARGE BULK MATERIALS

(71) Applicant: LUFT - UND THERMOTECHNIK BAYREUTH GMBH, Goldkronach (DE)

(72) Inventors: Reimund Friedel, Bayreuth (DE); Daniel Schroder, Bayreuth (DE)

(73) Assignee: LUFT-UND THERMOTECHNIK BAYREUTH GMBH, Goldkronach (DE)

( * ) Notice: Subject to any disclaimer, the term of this patent is extended or adjusted under 35 U.S.C. 154(b) by 0 days.

(21) Appl. No.: 14/085,542

(22) Filed: Nov. 20, 2013

(65) Prior Publication Data

US 2014/0076406 A1    Mar. 20, 2014

Related U.S. Application Data

(63) Continuation-in-part of application No. PCT/EP2013/066340, filed on Aug. 2, 2013.

(30) Foreign Application Priority Data

Aug. 3, 2012    (DE) .................... 20 2012 102 931 U

(51) Int. Cl.
  *G01F 11/00*      (2006.01)
  *B65G 65/48*      (2006.01)
(52) U.S. Cl.
  CPC ........ *B65G 65/4809* (2013.01); *B65G 65/4836* (2013.01); *B65G 65/4845* (2013.01); *Y10T 137/0318* (2013.01); *Y10T 137/8593* (2013.01)
(58) Field of Classification Search
  CPC ............. B65G 67/606; B65G 65/4836; B65G 65/4845; B65G 65/4809; B65G 65/489; B65G 65/48; Y10T 137/8593; Y10T 137/0318

USPC ........ 222/239–243, 410, 411, 199, 200, 233; 414/304, 311, 325
See application file for complete search history.

(56) References Cited

U.S. PATENT DOCUMENTS

| 746,410 | A | * | 12/1903 | Turner | ............................ 222/328 |
| 1,751,335 | A | * | 3/1930 | Kennedy | ........................ 414/325 |

(Continued)

FOREIGN PATENT DOCUMENTS

| DE | 924433 | 3/1955 |
| DE | 1940714 | 3/1971 |

(Continued)

OTHER PUBLICATIONS

Patent Cooperation Treaty, "International Search Report," issued by the International Searching Authority in connection with PCT application No. PCT/EP2013/066340, mailed Oct. 18, 2013 (10 pages).

(Continued)

*Primary Examiner* — Lien Ngo
(74) *Attorney, Agent, or Firm* — Hanley, Flight & Zimmerman, LLC

(57) ABSTRACT

Methods and apparatus to receive and discharge bulk materials are disclosed. An example method for treating gaseous fluid includes filling a device with ceramic granular material, a ceramic heat storage body, a catalyst body and a particle-shaped bulk material including calcium and/or carbon. The method also includes supplying gaseous fluid to be treated into a bulk material container and acting upon the bulk material in the bulk material container with the supplied gaseous fluid while discharging the bulk material out of the bulk material receiving apparatus.

31 Claims, 7 Drawing Sheets

(56) References Cited

U.S. PATENT DOCUMENTS

| | | | | |
|---|---|---|---|---|
| 3,793,742 A | * | 2/1974 | Rainville et al. | 34/586 |
| 4,020,980 A | * | 5/1977 | Illes, Jr. | 222/411 |
| 4,415,102 A | | 11/1983 | Teske | |

FOREIGN PATENT DOCUMENTS

| | | |
|---|---|---|
| DE | 1956293 | 5/1971 |
| DE | 3107966 | 9/1982 |
| DE | 8118614 | 10/1982 |
| DE | 3333115 | 3/1985 |
| DE | 3406413 | 8/1985 |
| DE | 3412216 | 10/1985 |
| DE | 8610421 | 6/1986 |
| DE | 4214491 | 11/1993 |
| FR | 1034396 | 7/1953 |
| GB | 1072847 | 6/1967 |
| GB | 1501667 | 2/1978 |
| JP | S60106735 | 6/1985 |
| JP | S60223726 | 11/1985 |
| JP | S60228284 | 11/1985 |

OTHER PUBLICATIONS

German Patent Office, "Search Report," issued in connection with German Patent Application No. 20 2012 102 9316, mailed Jul. 25, 2013 (10 pages).

International Searching Authority, "International Preliminary Report on Patentability," issued in connection with PCT Application No. PCT/EP2013/066340, mailed on Feb. 12, 2015, 12 pages.

International Searching Authority, "Written Opinion of the International Searching Authority," issued in connection with PCT Application No. PCT/EP2013/066340, issued on Feb. 3, 2015, 18 pages.

\* cited by examiner

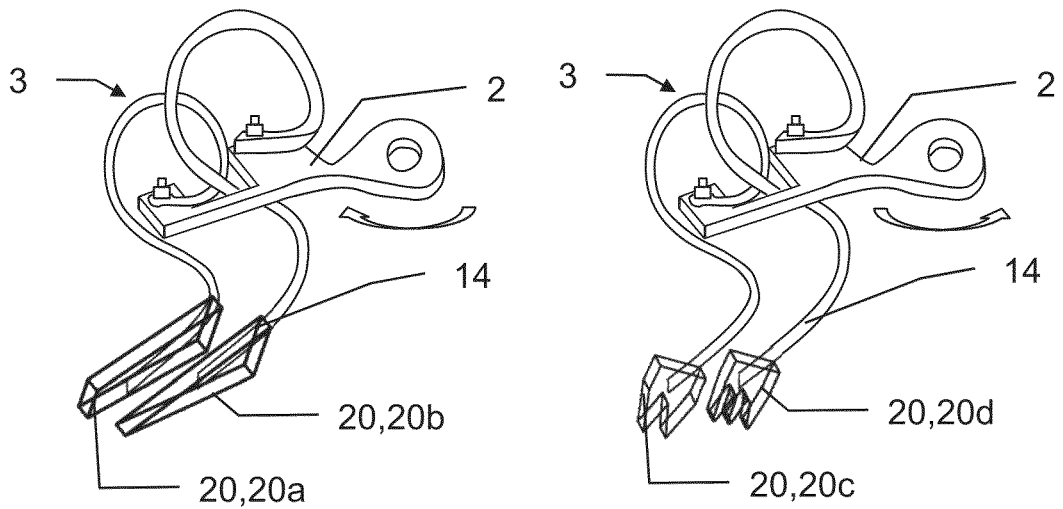
Fig. 3a　　　Fig. 3b
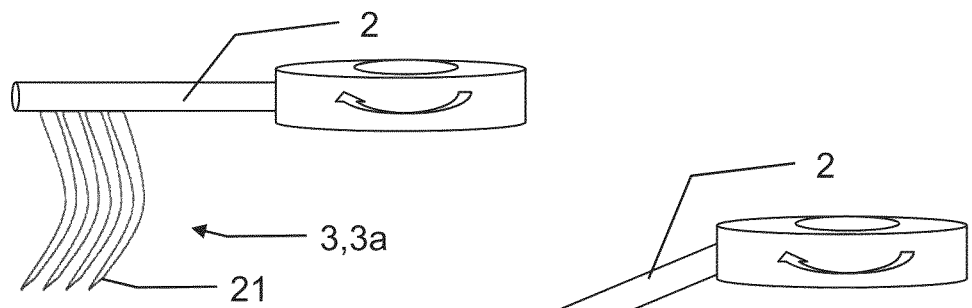
Fig. 4a
Fig. 4b
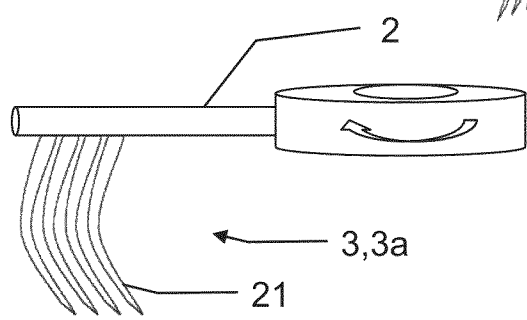
Fig. 4c

METHODS AND APPARATUS TO RECEIVE AND DISCHARGE BULK MATERIALS

RELATED APPLICATION

This patent arises from a continuation-in-part of International Patent Application No. PCT/EP2013/066340 which was filed on Aug. 2, 2013, which claims priority to German Patent Application No. 20 2012 102 931.6 which was filed on Aug. 3, 2012, both of which are hereby incorporated herein by reference in there entireties.

FIELD OF THE DISCLOSURE

This disclosure relates generally to receiving and discharging bulk materials, and, more particularly, to methods and apparatus to receive and discharge bulk materials.

BACKGROUND

DE 86 10 421 U1 describes a device for receiving bulk material which, on the bottom of a bulk material container, has at least one clearing arm. In an operating position, the clearing arm carries out a rotational movement about a center axis of the bulk material container in the operating direction of rotation by means of a drive. The clearing arm is pivotable toward the center of the bulk material container about a pivot axis, which is spaced from the center axis and extends parallel to the same, during a rotation in opposition to the operating direction of rotation. The clearing arm in one design is curved in a crescent-shaped manner, where a free outer end has a tip. Two or several clearing arms can also be provided distributed on the periphery of the bulk material container. The bottom of the discharge apparatus is flat. A pressure cone is arranged above the bottom in the bulk material container such that, in some examples, only the bulk material passing through a gap between the bottom edge of the pressure cone and the bottom is cleared out. The cleared out bulk material falls into a collecting funnel which is connectable to an output line.

A similar device having a discharge apparatus for a bulk material bunker is described in DE 81 18 614 U1. The clearing arm, in this example, is mounted on a shaft of a drive which is arranged in a pressure cone. The bottom also has a flat bottom. In addition, the clearing arm is mounted in a fixed manner on the shaft.

DE 33 33 115 C2 describes a device for receiving bulk material which is a bunker and has a discharge apparatus. The bunker has a bottom which is flat in part and slopes obliquely downward toward a center opening (e.g., extends in the manner of a truncated cone). A pressure cone in the form of a hood is arranged above the center opening. The rotatably mounted clearing vanes are moved above the bottom and guide the bulk material from the plane-parallel bottom to the central discharge funnel.

DE 1 940 714 B2 describes a device having a silo and having an apparatus for discharging bulk materials. The silo has a protective saddle on the bottom end and a bottom plate which is arranged under said protective saddle and is provided with a discharge opening. Two clearing arms are mounted on pivot pins between the protective saddle and the bottom plate. An outflow funnel is connected below the clearing arms. The pivot pins are connected to the rotating outflow funnel and the rear parts of the clearing arms, which protrude in relation to the rotational axes, are connected together at their inner ends by a longitudinally adjustable tension rod. Consequently, it is possible to set different inclined positions for the clearing arms.

BRIEF DESCRIPTION OF THE DRAWINGS

FIG. 3a and FIG. 3b show an example clearing arm with other example spring tines.

FIG. 4a, FIG. 4b and FIG. 4c show example clearing arms with clearing rakes having different clearing tines.

The figures are not to scale. Wherever possible, the same reference numbers will be used throughout the drawing(s) and accompanying written description to refer to the same or like parts.

DETAILED DESCRIPTION

Figure 1:
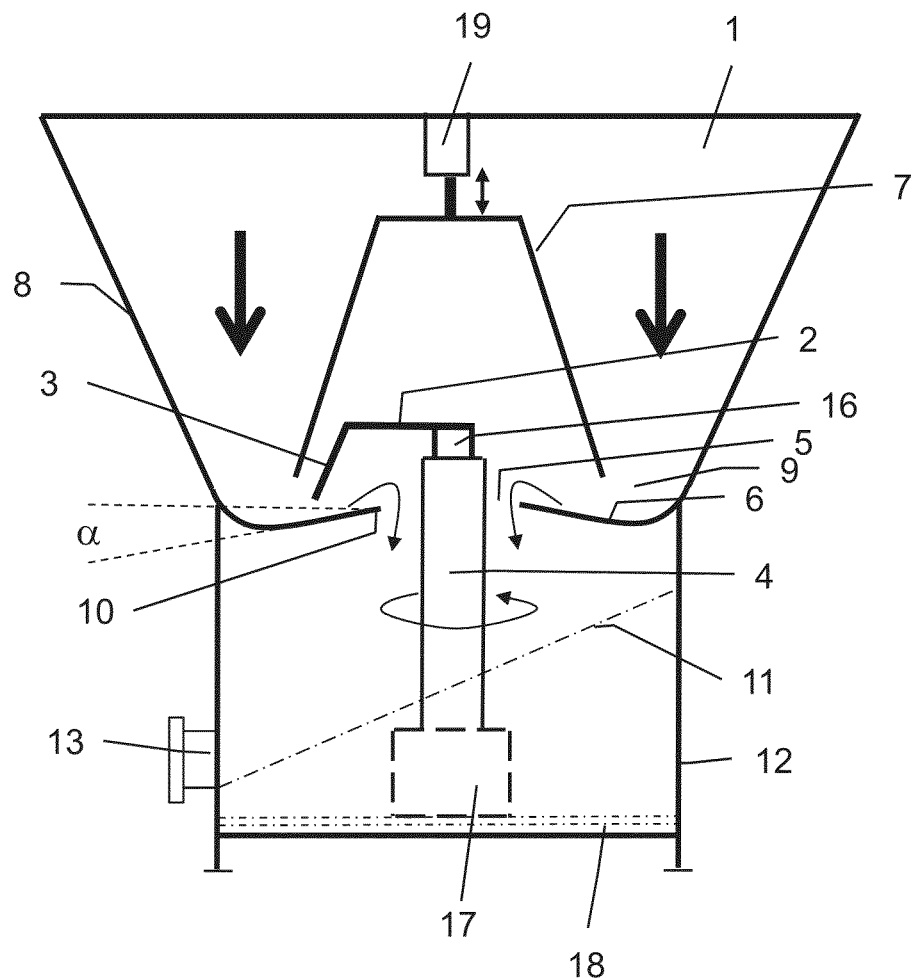
FIG. 1 shows an example first device for receiving bulk material, with a bulk material receiving apparatus and with a discharge apparatus.

The disadvantage associated with some known devices for receiving bulk material that have a bulk material receiving means, apparatus and/or containers and a discharge apparatus is that a bulk material receiving means positioned in a container, a silo, a bunker or a reactor is not able to be traversed with a gaseous medium in a co-current or counter-current flow when the corresponding discharge apparatus is operating. As a result of a pressure load produced by the gaseous medium, the bulk material, is pressed into the discharge opening such that a desired uniform discharge flow using the clearing tines is not possible. In addition, there is no guarantee that the bulk material is separated as extensively as possible into single particles during the discharge process. The separating of bulk materials into single particles is desired, however, in particular, when the bulk material is spherical and/or when the size of a regularly or irregularly formed coarse-particle bulk material is within a range of approximately greater than or equal to 5 millimeters (mm), for example. The disclosed examples relate to a device for receiving bulk material, said device having a bulk material receiving apparatus and/or container and having a discharge apparatus. Additionally or alternatively, the disclosed examples relate to an installation for treating gaseous fluid, in particular for the thermal and/or catalytic cleaning of polluted exhaust air, in particular of exhaust air which includes silicon-organic compounds, for example. In addition, the disclosed examples relate to a method for discharging bulk material out of a bulk material receiving apparatus and a method for treating gaseous fluid.

The examples disclosed herein provide a device for receiving bulk material having a bulk material receiving apparatus and having a discharge apparatus. The example device, during the discharging of bulk material, is to act upon the bulk material with a gaseous medium and, in particular, to traverse the bulk material received in the bulk material receiving apparatus with a gaseous medium. In some disclosed examples, the bulk material is separated out into individual particles while being discharged out of the bulk material receiving apparatus.

Additionally or alternatively, the disclosed examples provide an installation for treating gaseous fluid, in particular for the thermal and/or catalytic cleaning of polluted exhaust air (e.g., exhaust air which includes silicon-organic compounds), which is able to be operated continuously over large periods of time and where bulk material received in a bulk material container is acted upon with gaseous fluid such as, for example, polluted exhaust air.

Additionally or alternatively, the disclosed examples provide an example method for discharging bulk material out of a bulk material receiving apparatus, by way of which the bulk material is able to be acted upon with gaseous fluid during the discharging process, and to create a method for treating gaseous fluid which can be carried out over long periods of time without interruptions.

The example device for receiving bulk material comprises a bulk material receiving apparatus and includes a discharge apparatus. The bulk material receiving apparatus, in some examples, has a bottom with a discharge opening and an outer surface wall. In some examples, the discharge apparatus includes at least one clearing member that is mounted on a bearing column so as to be rotatable about a center axis that passes through the discharge opening. In some examples, there is preferably one pressure cone that is arranged above the bottom and is passed through by the center axis and forms a discharge gap with the outer surface wall and the bottom. The example discharge apparatus also includes a drive for the clearing member, to enable the clearing member to be rotated about the center axis in an operating direction of rotation. At least one clearing tine is fastened on the at least one clearing member, said clearing tine dipping into the bulk material received in the bulk material receiving apparatus when the clearing member is moved in a rotating manner about the center axis in the operating direction of rotation and pushing the bulk material toward the center axis, wherein the bulk material falls from the bottom through the discharge opening.

In some examples, the device has a pressure cone that engages over the clearing member. For example, the clearing member of the device is arranged in the interior of the pressure cone and in this way is screened from the bulk material received in the bulk material receiving apparatus. Consequently, in some examples, it is substantially ensured that, when moving in a rotating manner about the center axis, the clearing member does not have to displace any bulk material. Thus, in some examples, the bulk material is then not able to build up in front of the clearing member and obstruct the rotational movement.

In some examples, the bottom is a diffuser bottom that ascendingly extends to the discharge opening. The shaping of the diffuser bottom enables the speed of flow speed of the bulk material moved to the outlet opening in the bulk material receiving apparatus to be slowed down. The shaping of the diffuser bottom also enables corresponding erosion of the angle of repose, which forms at the outlet by a moved spring tine, to substantially not affect the bulk material freely flowing out without any arching.

In some examples, it is advantageous when the diffuser bottom, which extends ascending to the discharge opening, has a rounding portion and an inclined surface that ascends at an angle, a, to the central discharge opening. The rounding and the corresponding ascending flat region of the diffuser bottom cause the bulk material, due to the angle of repose being set as a result, not to be able to flow freely (e.g., of its own accord), but to be discharged (e.g., able to flow out freely), once the bulk material is cleared away by a clearing tine.

In some examples, the clearing member can be implemented as, for example, a clearing arm. In some examples, the clearing tine is a spring tine or clearing rake.

The spring tine, in this example, does not dip (e.g., similar to a sickle) radially into the bulk material, but rather dips from above into the filling and displaces just a small part of the bulk material, which is enough to push individual particles and/or spheres over the edge of the bottom, in particular of the diffuser bottom. In some examples, the curved form of the spring tine substantially prevents the bulk material from being able to build up in front of the clearing arm and resulting in increased resistance, but rather being able to deflect. A preferred characteristic of the spring tine, in this example, is that, as a result of the development of the clearing tine, the region being dipped is able to deflect in the lateral direction and upward to substantially avoid the clearing device from sticking and/or becoming stuck in the bulk material. Suitable tine forms are accordingly all those that enable said deflecting in these two directions such as, for example, by a spring system that is also to be understood in this regard under the term "spring tine".

A clearing rake, in this example, preferably has a plurality of raking tines. The raking tines, in this example, are arranged substantially parallel to one another spaced on a raking arm or directly on the clearing arm. As set forth herein, the term substantially parallel means within about 10-degrees of parallel or accounts for manufacturing tolerances. Depending on the type of bulk material, the raking tines are implemented in a straight or curved manner and/or inclined in the direction of rotation or in opposition to the direction of rotation. In some examples, it can also be advantageous for the raking tines to be implemented in a profiled manner, in particular in a tapering manner, toward their end remote from the clearing arm. The width of the raking tines, in this example, is preferably smaller than the dimension (Dim) of individual bulk material particles. In some examples, the spacing between adjacent raking tines is once again preferably of similar dimension, in particular larger in dimension than the dimensions (Dim) of individual bulk material particles. In an advantageous manner, in some examples, to avoid arching between adjacent raking tines and/or to avoid bulk material particles backing-up in front of a raking tine, a spacing is at least five times, in particular at least ten times the dimension (Dim) of the bulk material particles, in particular of the largest bulk material particles in the filling. The raking tines, just as the spring tines, dip into the filling from above and displace a small part of the bulk material over the edge of the bottom, for example. A build-up of bulk material in front of the clearing arm can be effectively prevented as a result of the dimensioning of the raking tines and the spacing's between them.

In an advantageous further development, in some examples, the clearing tine has a clearing body on its end that reaches into the bulk material. The term clearing body, in some examples as used herein, is a structural element such as a tip, a wedge, a spade blade, a plow-like vane or the like, which is provided for the purpose of promoting the separating of the granular bulk material into single particles in the direction of rotation. In this example, the dimensions, set angles, surface forms and/or edge developments of the clearing body are preferably matched to the respective bulk material to be discharged in each case. In this example, an advantageous further development can be provided when the clearing body is fastened on the clearing tine so as to be exchangeable such that when a different bulk material is used, the clearing body that matches the bulk material can be provided on the clearing tine.

In some examples, an inclined bottom with side walls is arranged at the discharge opening, said inclined bottom opening out into a discharge channel or into a discharge pipe. The inclined bottom, in this example, enables the removal and preparation of the discharged bulk material for subsequent processes.

In some examples, the example device includes an independent housing that is implemented in a substantially funnel-shaped manner and consequently is able to be moved under a silo, a bunker or a reactor that has outlet openings for the bulk material on the bottom surface. The bulk material, in the example design, passes into the container of the discharge apparatus and is discharged over the edge in the desired manner by the rotating clearing arms with the clearing tines fastened thereon via the obliquely ascending lower bottom wall, as a result of that the bulk material is held back by the upright edges and, in some examples, only the bulk material comes into contact with the discharge tine is discharged in the desired manner. To a certain extent, in some examples, this is a targeted process for separating the bulk material into single particles such that the discharge of the bulk material is itself determined substantially by the form of the tines, the form of the diffuser bottom, the size of the particles as well as the rotational speed of the clearing arm.

The shaping of the diffuser bottom also has the advantage that, in some examples, said diffuser bottom interacting with a pressure cone substantially prevents and/or prevents the bulk material from being able to be pressed through the discharge opening when gaseous media is introduced into said bulk material. In some examples, the ascending inside flanks of the bottom interacts with the bottom edge of the pressure cone to substantially prevent the bulk material from being able to be pressed through the discharge opening. In some examples, the diameter of the edge of the pressure cone is dimensioned such that, in conjunction with the corresponding lateral surface of the outside cone, a mass flow of bulk material is produced. In some examples, the inner pressure cone and the outer housing outer surface wall includes a perforated sheet to achieve and/or enable gas permeability. In some examples, the advantage of the shaping of the diffuser bottom as disclosed herein is also that the outflow of the bulk material is provided when a clearing device is active and is without arching.

In some examples, the example device is designed as a component part of the silo. In some such examples, the funnel-shaped container of the bulk material receiving apparatus is integrally molded. The pressure cone can then be inserted into the bulk material receiving apparatus. In some examples, the same applies to the clearing arm with the clearing tine extending therein. In some examples, the device is movable. It can then be fitted into and/or used in connection with different containers and silos. Additionally or alternatively, adapting to the respective bulk material is possible in a manner by bringing in a different pressure cone or by bringing in a different diffuser bottom with a higher gradient and different spacings to the bottom edge of the pressure cone. In some examples, to enable proper and/or desired functioning of the discharge apparatus for the geometric conditions, namely the wall angle and the radius of the diffuser bottom, the clearing arm and the baffles as well as the clearing tines are matched to the bulk material to be discharged. Taking this into consideration, in some examples, the bulk material is prevented from arching or flowing through the discharge apparatus.

Based on the angle of friction of the wall and on the angle of repose of the bulk material, in some examples, the angle of the wall and the free cross sectional outlet defined by the diffuser bottom are selected such that the bulk material is precisely not able to flow out freely. Instead, in some examples, the discharge is effected by way of the clearing tines that convey the bulk material over the edge of the outlet opening such that the bulk material is able to fall into the container located below, preferably a container with an inclined bottom, and is able to be discharged into a removal channel or by a connected pipe.

Through the use of spring tines, as are known in agriculture for the thorough mixing of sandy soils, in some examples, the bulk material is mixed while at the same time being distributed lengthwise of the dipping portion such that the bulk material is pushed by the spring tines practically particle by particle over the edge of the outlet opening. The diffuser bottom slows down the outflow and, in some examples, only permits the bulk material engaged behind to fall out. In some examples, the spring tines include and/or are made of spring steel and in each case have a portion that dips into the bulk material in a crescent-shaped manner in the direction of rotation and serves as an extension of an arc-shaped spring metal part, which extends upright into the interior of the pressure cone and is fastened on the clearing arm and said clearing arm is fastened on the drive shaft that protrudes out of the bearing column. Such spring tines can be provided on the clearing arm in pairs, the spring tines being able to be fastened radially and vertically offset on the clearing arm. In some examples, the end of the outer spring tine ends are in front of the rounding part of the diffuser bottom, while the ends of the inner spring tines end are above the inclined surfaces of the diffuser bottom. The portion itself and/or the spring tines may be implemented by extending such that it dips into the filling from above by way of a small bow-shaped part in order to keep the resistance low during the clearing out process. When the clearing arm rotates, in some examples, spherical bulk material (e.g., spheres) is/are discharged over the obliquely extending clearing-out surfaces of the clearing tines. The form of the tines enables, among other things, the tine to deflect if the bulk material backs up (e.g., congestion of sphere). In some examples, the design of the spring tines prevents the clearing arm from becoming blocked and lifting up and consequently prevents an interruption in the discharging process.

In order to make it possible in a manner to adapt to bulk material with different particle sizes, the pressure cone can be arranged so as to be vertically adjustable in the discharge apparatus or in the bulk material container. In examples in that the discharge apparatus has an independent housing and is designed to be movable under a silo, it is possible to provide a top crossbeam on that a pulling apparatus (e.g. a motor with a spindle), can be mounted in order to be able to adjust the height of the pressure cone in relation to the diffuser bottom.

In an advantageous manner, in some examples, the outer surface wall or the receiving funnel of the discharge apparatus or of the bulk material container is implemented by tapering downward in a conical manner and merges in an arc-shaped manner into the diffuser bottom, which preferably has an inclined surface that ascends substantially inwardly to the discharge opening.

In order to obtain a continuous and/or substantially continuous discharge, in some examples, several spring tines and/or clearing arms can also be arranged and/or distributed along a circumferential path (e.g. two such arrangements offset by 180° or three such arrangements offset by 120°) and fastened on the shaft.

In an advantageous manner, the bulk material output by the discharge opening can be collected into a container with an inclined bottom located below said discharge opening and can then be removed by a discharge channel or a discharge pipe. For example, a bulk material conveyor, by the discharged bulk material is directed to other containers or machines for further processing, can be connected to the discharge pipe. However, if circulation is necessary, in some examples, the bulk material can be brought back into the container at the top. However, it can also be provided that the bulk material output by the discharge opening is collected directly in a collecting or conveying container. The collecting or conveying container, in this example, is preferably drivable, self-drivable and arranged so as to be exchangeable in another manner under the discharge opening.

The bulk material can be prevented from sticking as a result of the geometry of the clearing arms and/or based on the spacings to the diffuser bottom. The clearing arms are mounted in a radial manner on a vertical shaft. The shaft is driven by a gearing unit by an electric motor fastened in the foundation.

Additionally or alternatively, the disclosed examples relate to the use of the device in an exhaust air cleaning installation, in particular in a thermal and/or catalytic exhaust air cleaning apparatus. This is particularly advantageous whenever a heat storage medium and/or reactant and/or catalyst material that is present as a filling or is processed to form a filling is used for the cleaning of exhaust air loaded with harmful substances. The discharge apparatus in a device, in this example, enables the throughput of exhaust air to be kept constant over long periods of time as filling that has been used up during continuous operation by activation of the discharge device and/or has become unusable as result of contamination can be removed out of the bulk material container without the bulk material discharge being impaired by the exhaust air flow or vice versa. The use of the discharge apparatus is particularly advantageous for cleaning exhaust air that has a tendency to form serious deposits during conversion of the harmful substances, as is the case, for example, with silicon-organic compounds in the exhaust air.

In a further aspect, the disclosed examples relate to a method for discharging a bulk material out of a bulk material container including the arrangement of discharge apparatus with a receiving funnel having a discharge opening, a pressure body, preferably a pressure cone, which is arranged in the receiving funnel, in particular coaxially with respect to a center axis of the receiving funnel, and at least one clearing member that is arranged below the pressure body, is drivable rotationally about the center axis and is preferably implemented as a clearing arm with at least one clearing tine below the bulk material container, the example method including the following processes.

In some examples, the bulk material is put into the bulk material receiving apparatus, which, in some examples, is preferably implemented as a receiving funnel, the bulk material being diverted from the pressure body in the direction of an outer wall of the bulk material receiving apparatus and flowing in part around the pressure body, the bulk material receiving apparatus being filled with bulk material in such a manner that a pressure line of the pressure height, h, of the bulk material to be discharged is formed below the pressure body in the direction of the outlet opening, the clearing tine engaging into the bulk material to be discharged from above through the pressure line substantially in the axial direction along the center axis; in particular in this example, the pressure line does not form a standard height h, but rather the height, h, decreases in the direction of the discharge with the angle of repose corresponding to the respective bulk material.

In some examples, the rotary drive of the clearing arm is put into operation in the operating direction.

In some examples, the backed up bulk material that lies in front of the at least one clearing tine is partially displaced and separated into single particles in the direction of the discharge opening in the bulk material receiving apparatus.

In some examples, the bulk material displaced and separated into single particles in such a manner is discharged through the outlet opening and substantially simultaneously the bulk material located in the bulk material receiving apparatus descends until the pressure height, h, is achieved again below the pressure body.

In some examples, the processes of displacing and separating out into single particles, discharging and descending are repeated as long as the rotary drive of the clearing arm is active.

In some examples, the discharging of bulk material and descending of the bulk material located in the bulk material receiving apparatus dries up until the pressure height, h, is reached again below the pressure body after deactivating the rotary drive.

To get the bulk material into the receiving funnel, the bulk material receiving apparatus is arranged in a favorable manner at a connecting point with a connecting opening, arranged, in some examples, preferably in a bottom end surface of the bulk material container, in particular connected there to the bulk material container. In a preferred manner, in this example, the connecting opening can essentially and/or substantially cover the entire bottom end surface of the bulk material container, as a result of which almost the full cross section of the receiving funnel can be used to get the bulk material into the discharge apparatus.

For the funnel-shaped tapering of the receiving funnel, the pressure body additionally narrows a cross section along the center axis for the passage of the bulk material through the receiving funnel as well as a passage area between the bottom of the receiving funnel and a bottom-facing edge of the pressure body. In this example, the bulk material forms a pressure line below the pressure body with a pressure height, h, predetermined by the angle of repose. Preferred pressure bodies, in this example, are implemented by widening conically in the direction of the bottom and in a particularly preferred manner they are substantially hollow inside.

As a result of the clearing tine engaging into the bulk material to be discharged from above through the pressure line substantially in the axial direction along the center axis, a build-up of the bulk material in front of the clearing arm is effectively prevented and there is no increased resistance with reference to the rotational movement of the clearing arm. The bulk material is consequently able to be discharged advantageously in a uniform manner.

In a further development of the method, in some examples, it is provided that the bulk material to be discharged assumes an imaginary pressure height, $h_{max}$, in the receiving funnel radially outside of the pressure body, while the pressure height, h, of the bulk material to be discharged below the pressure body decreases to a minimum pressure height, $h_{min}$, in the radial direction toward the outflow opening, in particular inside an inner circular area that can be driven around by the clearing tine. The effect of separating the bulk material particles into individual particles by the clearing tine and the pressure body is advantageously promoted as a result, for example. In some examples, $h_{min}$, is first achieved on the edge of the outlet opening. However, in other examples, $h_{min}$ is already achieved at a radial spacing from the edge of the outlet opening.

In other examples, where applicable supplementing further developments of the method, it is provided that in opposition to an outlet direction of the bulk material out of the outlet opening through said outlet opening and/or a bottom that is implemented at least in part or in portions, in particular in the region of the outlet opening, so as to be permeable, in particular gas-permeable, a fluid flow, in particular a gas flow, preferably an exhaust air or exhaust gas flow, passes through the bulk material into a bulk material receiving apparatus, implemented as a receiving funnel, and from there through the bulk material into a bulk material container, whereby it interacts with the bulk material. Using said further development, it is possible, for example, to dry the bulk material by a warm or hot air flow, in particular a dry warm or hot air flow. A preparation, in particular an activation of the bulk material for a processing process and/or treatment process connected downstream of the outlet at the outlet opening can also be effected by a suitable fluid flow. Also, in a reverse application, the gas itself can be subject to a preparation or conversion by the interaction with the bulk material, for example. In particular, an exhaust air flow or an exhaust gas flow loaded with harmful substances can be subject to a cleaning process with the bulk material, as a result of which preferably a pure gas is generated.

In a further development of the previously described method, in some examples, it is provided that the generated pure gas or the exhaust air or exhaust gas flow cleaned by the interaction with the bulk material is removed, in particular evacuated, by an exhaust air opening provided above the receiving funnel in the bulk material container.

In some examples, the method is provided that the fluid flow is an exhaust air flow or exhaust gas flow that is loaded with harmful substances, in particular gaseous, liquid and/or particulate harmful substances, and that the fluid flow interacts with the bulk material in such a manner that one or several harmful substances that are entrained in the exhaust air flow or exhaust gas flow or pollute the same are converted to harmless substances, in particular environmentally compatible substances, preferably clean gas.

In some examples, the disclosed examples relate to an exhaust air cleaning apparatus for the thermal and/or catalytic cleaning of polluted exhaust air, in particular exhaust air containing organic-silicon compounds. The term harmful substance, in some examples as used herein, is to be understood as a substance that can have damaging effects that are harmful to the environment or to health and/or for subsequent processing processes. The harmful substances, in this example, can include at least pollution gas, pollution vapor, pollution fluid, a pollution liquid and/or pollution particles entrained by the exhaust air, for example.

The exhaust gas cleaning apparatus, in this example, includes a bulk material container, which accommodates a bulk material that acts in a filtering and/or catalytic manner on the exhaust air, in particular on at least part of the harmful substances included in the exhaust air, and a discharge apparatus for discharging the bulk material out of a discharge opening, wherein at least part of the exhaust air to be cleaned enters into the container through the discharge opening.

Additionally or alternatively, at least one portion of the bottom can also be permeable in such a manner to the polluted exhaust air such that the polluted exhaust air is able to enter into the container by said portion. However, in this example, the portion is preferably implemented so as to be bulk material tight such that the bulk material to be discharged is, in some examples, only able to exit by the outlet opening.

Additionally or alternatively, it can also be provided that at least one portion of the receiving funnel, of the outer surface wall of the bulk material container, of the bulk material container and/or of the housing outer surface wall is permeable in such a manner to the polluted exhaust air such that the polluted exhaust air is able to enter into the container by said portion. However, in this example, the portion is preferably implemented so as to be bulk material tight such that the bulk material to be discharged is, in some examples, only able to exit by the outlet opening.

Additionally or alternatively, the disclosed examples relate to a method for the thermal and/or catalytic cleaning of polluted exhaust air, in particular exhaust air including organic-silicon compounds, in an exhaust air cleaning apparatus according to the afore-described type, at least part of the exhaust air being brought into the container by the discharge apparatus in opposition to the direction of discharge of the bulk material and the bulk material that acts as a heat storage mass and/or catalyst being traversed in opposition to the direction of discharge, it being converted to clean gas.

In an alternative definition of the method for the thermal and/or catalytic cleaning of polluted exhaust air, in examples when the exhaust air includes organic-silicon compounds, in an exhaust air cleaning apparatus according to the afore-described type, the exhaust air is pre-heated in a regenerative manner by a heat storage mass and/or is converted by a catalyst mass, at least part of the heat storage mass and/or catalyst mass being a filling. In some examples, the example device can be used for removing, cleaning and introducing the filling, in particular for removing the deposits formed by the oxidation of the organic-silicon compounds, the spent filling can be removed out of a bulk material container of the exhaust air cleaning apparatus by the discharge apparatus.

The example device 1 shown in FIG. 1 can be the bottom part of a bulk material container or also a discharge apparatus with a housing that is movable under a bulk material container.

In some examples, the device for receiving bulk material has an outer surface wall 8 that is tapering downward. As a result, the bulk material input into and/or added to a bulk material receiving apparatus 1' is conveyed toward the center when running in or descending. The downwardly directed arrows shown specify the direction of movement of the bulk material. In some examples, a crossbeam is arranged at the top. According to example of FIG. 1, a lifting apparatus 19, by means of which the height of a pressure cone 7 inserted into the bulk material receiving apparatus 1 is adjustable in relation to the bottom 6, is situated on said crossbeam. In this example, the bottom is implemented as a diffuser bottom 6. In particular laterally, the bottom 6 has an arc-shaped connection to the outer surface wall 8 that merges into an inclined upwardly extending bottom portion that is arranged at the angle, α. The angle, α, can be, for example, approximately 10° and is designed in dependence on the bulk material. The bulk material itself passes by the inside ring-shaped edge 10 of the discharge apparatus 5 into the container with the side walls 12 located below. In some examples, the container and also the bulk material receiving apparatus 1 located above can be implemented with a round or angular cross section or any suitable cross section. The example container according to FIG. 1 also has an inclined bottom 11 such that the bulk material is able to move over the inclined bottom 11 in the direction of the discharge pipe 13 by the force of gravity.

Additionally or alternatively, in some examples, a conveying apparatus such as a conveyor belt or an outlet for transporting the discharged bulk material away can also be provided.

The diameter of the edge of the pressure cone 7, which acts as a pressure body, is dimensioned such that, in conjunction with the corresponding lateral surface of the outer cone 8, a mass flow of the bulk material is produced. The pressure cone 7 and/or the outer lateral surface of the outer cone 8 can also include a perforated plate in order to achieve gas permeability.

In some examples, the discharge pipe 13 is provided with a connecting piece in order to be able to produce a connection to a connecting pipe, in order, for example, to be able to supply the bulk material to a machine that processes it further. In some examples, a motor with a gearing unit and a bearing column 4 is fastened on the bottom 18 of the container. In this example, the drive shaft 16 is guided through the bearing column 4, at least one clearing member, which is implemented as a clearing arm 2 that carries a clearing tine 3, namely a spring tine, is fastened on the upper end of said drive shaft. The pressure cone 7 engages over the clearing arm 2. In some examples, the clearing tine 3 dips into the bulk material inside the pressure cone 7 and ends in front of the diffuser bottom 6 that is directed inclinedly upward. The clearing tine or spring tine 3 is moved along a circular circumferential path about the center axis 4' when the drive shaft 16 is rotated in the operating direction 17'. The spacing A of the bottom end of the clearing tine remote from the center axis 4, in this example, is smaller than half the diameter of the opening of the pressure cone 7 pointing to the discharge opening 5. In some examples, the bulk material itself penetrates the discharge gap 9 during discharge by the spring tine 3 and descends into said region such that it can be displaced with the spring tines and removed over the edge 10 of the discharge opening into the container located below. It can be seen that the development of the floor ensures that, in some examples, only the bulk materials displaced by the spring tine 3 are discharged.

Figure 2:
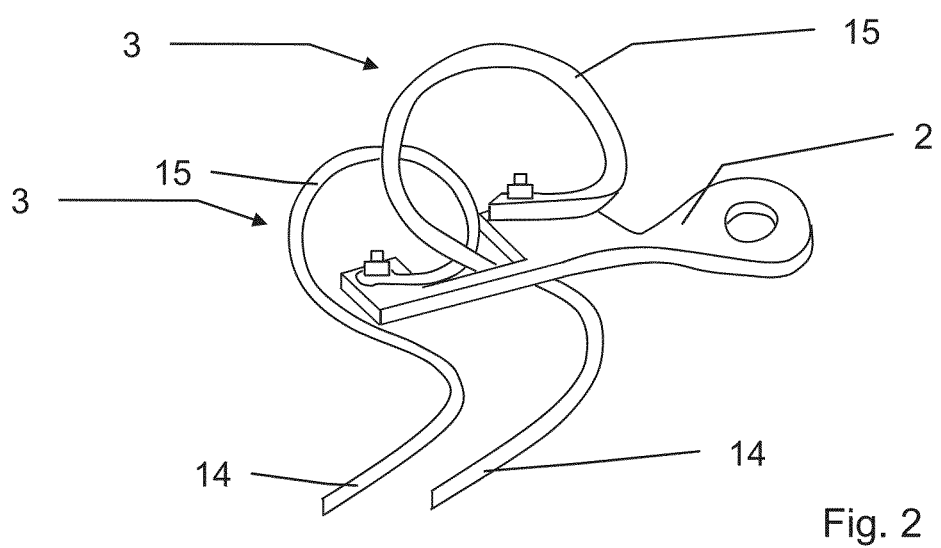
FIG. 2 shows an example clearing arm with spring tines.

FIG. 2 shows an example design of the example spring tines 3. In other examples, the spring tines can also be arranged offset vertically and radially on a clearing arm 2. They have bottom portions 14 that dip into the bulk material. The portions 14 merge into the resilient metal parts 15 that are fastened on the clearing arm 2 by screws and/or fastener(s). The gradient of the portions 14 and the arrangement thereof is provided such that defined amounts of bulk material are discharged during a revolution of the drive shaft 16, and of the rotational movement of the clearing arm 2 connected thereto, in an operating direction of rotation 17' about the center axis 4' of the bulk material receiving apparatus 1'. In some examples, a defined discharge gap 9 is provided by the shape of the bottom and by the mounting of the pressure cone 7. Said discharge gap substantially prevents gas blown-in for drying the bulk material, for example, from causing the bulk material to be displaced over the edge of the discharge opening 5 and takes care that the discharge is effected, in some examples, only by the rotating clearing arm 2 with the clearing tines 3 located thereon.

FIG. 3a and FIG. 3b show further different example developments of example spring tines 3, an example clearing body 20 being arranged on each of the portions 14 that dip into the bulk material. The clearing body 20, in this example, is preferably arranged in front of the respective portion 14 with reference to the operating direction of rotation 17', which is indicated by the directional arrow in the clearing arm 20. However, it can also be advantageous when the clearing body 20 is implemented in a deviating manner as a trailing body and is positioned lying behind the respective portion 14 with reference to the operating direction of rotation 17'. In a preferred manner, the clearing body 20, in this example, is fixedly connected to the respective portion 14, in a particularly preferred manner, in some examples, it is implemented integrally with said portion or is integrally molded on the same. If, contrary to this, the clearing body 20 is exchangeable, fixedly connectable to the respective portion 14, worn clearing bodies 20 can thus be easily exchanged and/or clearing bodies 20 adapted particularly to the respective bulk material can be exchanged so as to suit the bulk material.

FIG. 3a, in this example, shows as an example two different developments of clearing bodies 20. While other shapes and/or sizes may be used, the clearing body 20a in this example is implemented as a substantially flat, trapezoidal spade blade, while the clearing body 20b has a substantially flat, triangular blade shape. Along with the blade geometries shown in a concrete manner here, other polygonal shapes and/or rounded corners and/or edges can also be advantageous to the blade shape of a clearing body 20. In some examples, it is advantageous when the clearing bodies are flat, but are folded or curved by a certain angle about the respective portion 14. A curvature with respect to a direction of extension of the respective portion 14 can also be provided.

FIG. 3b shows as an example two further developments of a substantially flat clearing body 20. In this example, the clearing body 20c is implemented as a double roof shape with substantially sharp-edged transitions, while the clearing body 20d has a triple roof form with rounded corners. In an analogous manner to the designs for the examples in FIG. 3a, corresponding modifications to corners, edges and/or surface development can produce advantageous designs of a clearing body 20 also in the case of the clearing bodies 20a, 20b of FIG. 3b.

Additionally or alternatively, clearing bodies 20 with three-dimensional surface features, such as, for example, prisms, pyramids, cones, saddle faces and the like can also be advantageous to the discharging of certain types of bulk material.

FIG. 4a, FIG. 4b and FIG. 4c show an example clearing member that is implemented as a clearing arm 2 for use in the example device, said clearing member having a clearing rake 3a with raking tines 21 that act as clearing tines 3 in place of the spring tines described above by way of FIG. 2, FIG. 3a and FIG. 3b. While other arrangements may be used, the clearing rake 3a, in this example in particular, is to be understood as a rake-like clearing arrangement that has at least two, preferably three, four or more raking tines 21 for displacing bulk material. However, the clearing rake 3a may have any number of raking tines (e.g., 2, 4, 5, 6, etc.). In this example, the raking tines 21 are aligned in particular substantially parallel to one another, preferably substantially in alignment along the clearing arm 2. However, it can also be advantageous when the raking tines 21 have a variable alignment with respect to their radial spacing on the clearing arm 2. Thus, for example, a set angle, a development of curvature, a tine length, a tine width and/or a tine shape can vary by way of the radial spacing from the rotational axis of the shaft 16 (e.g., the center axis 4). The raking tines 21, in this example, preferably have a tine width transversely with respect to the operating direction of rotation, which at a maximum is the same size, preferably is smaller than a particle of the bulk material in order to oppose the rotary drive with as small as possible a resistance. The spacing between adjacent raking tines, in this example, is preferably of at least a similar size as the particle of the bulk material in order to bring about as targeted a displacement of bulk material particles as possible by the clearing rake.

In this examples, the clearing member 2 shown in FIG. 4a with a clearing rake 3a has four raking tines 21 that are curved in the operating direction of rotation indicated by the arrow and that are arranged on the clearing member 2 and are to reach from above through a pressure line of the bulk material in the discharge apparatus.

The clearing member 2 shown in FIG. 4b with a clearing rake 3a is tilted with reference to the plane at right angles relative to the center axis 4 acting as the rotational axis (e.g., with respect to the plane of the rotational movement). Here too there are raking tines 21 that act as clearing tines 3 that are arranged on the clearing arm 2 at a distance from the center axis of this clearing member 2. As a result of said tilting, additional adaptation of the clearing arrangement 2, 3, 3a to the bottom 6, in particular to the diffuser bottom 6, can be achieved.

The example clearing member 2 shown in FIG. 4c differs from the example clearing member 2 shown in FIG. 4a in that the clearing rake 3a is implemented as a trailing rake. In this example, the raking tines 21 are curved in opposition to the operating direction of rotation 17' indicated by the arrow.

In a preferred further development, in some examples, the raking tines 21 of the clearing rake 3a are not connected directly to the clearing member 2, but are arranged on a common rake crossbeam, in particular are fastened on said crossbeam. In some example, the rake crossbeam can then be fastened on the clearing member 2 in a preferred manner so as to be replaceable, as a result of which worn clearing rakes 3a and/or clearing rakes 3a adapted to the respective bulk material can be easily exchanged. An exchange with a spring tine is also possible as a result.

Figure 5:
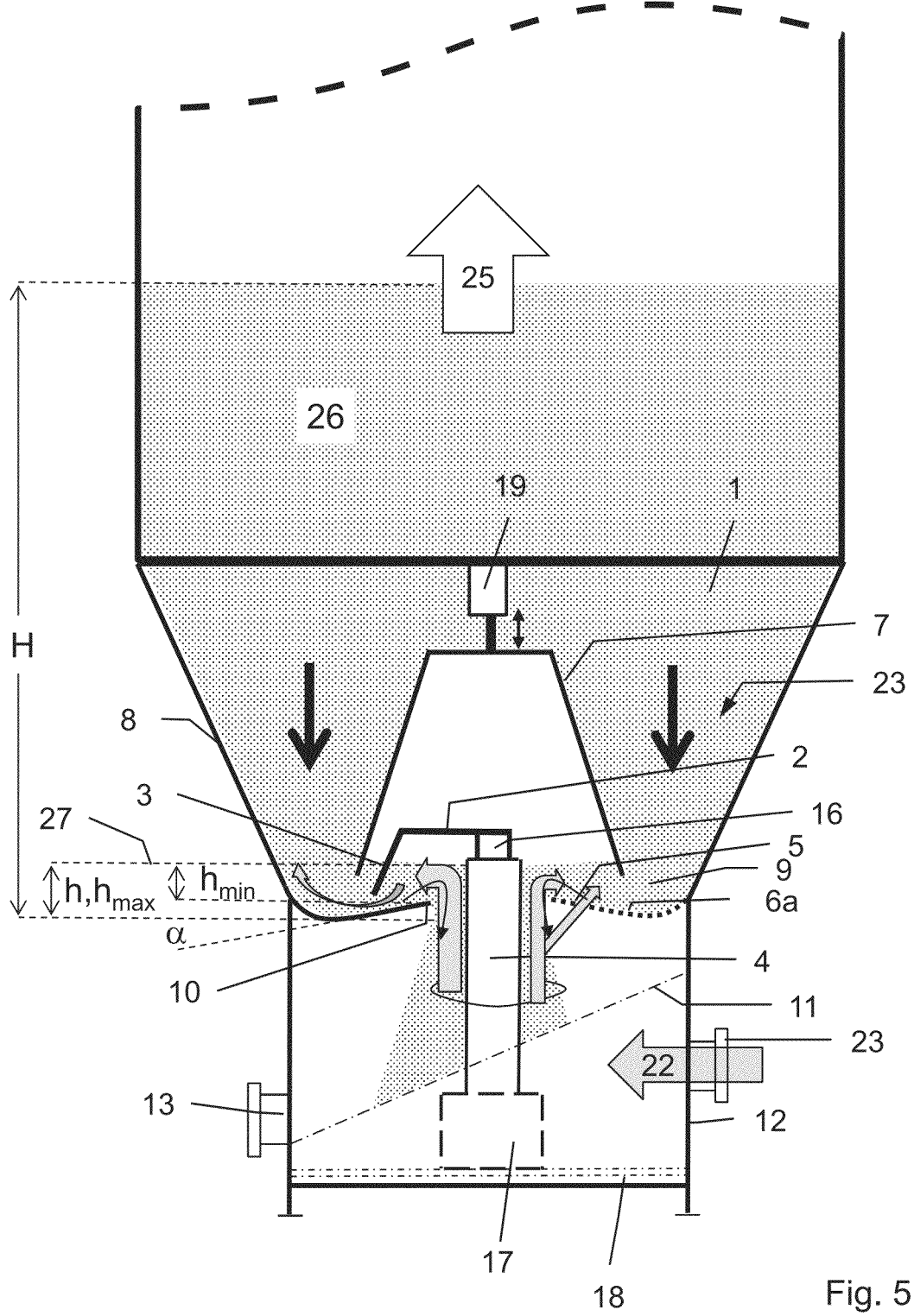
FIG. 5 shows a second example device for receiving bulk material, with a bulk material receiving apparatus, a discharge apparatus and a connection for supplying gaseous fluid.

FIG. 5 shows the use of a further example device 1 having a discharge apparatus for discharging bulk material similar to the one described by way of FIG. 1, it being possible for the bulk material to be traversed by a fluid flow 22 that flows in opposition to the discharge direction. The fluid flow is introduced, in this example, quasi in the counter flow to the discharge of the bulk material. Particularly preferred uses of this type are, for example, produced in the case of drying applications and/or preliminary treatment applications for the stored bulk material or in the cleaning of polluted exhaust air or exhaust gas.

The example device 1 shown in FIG. 5 can be the bottom part of a bulk material container that is used in a thermal and/or catalytic exhaust air cleaning apparatus or also a discharge apparatus with a housing that is movable under a bulk material container that is used in a thermal and/or catalytic exhaust air cleaning apparatus.

The bulk material 26 fills out the interior of the discharge apparatus, which is formed by the outer surface wall 8 and the bottom 6, by descending, running in or re-pressing. As already stated for FIG. 1, on the one hand, in this example, the pressure cone 7 narrows the radial cross section of the bulk material receiving apparatus 1' between the outer surface wall 8 and the pressure cone 7 in an increasing manner in the direction of the bottom 6. On the other hand, in this example, the pressure cone 7 also narrows a discharge gap 9 between the bottom 6 and a bottom edge of the pressure cone 7, a pressure line 27 of the pressure height h of bulk material forming under the pressure cone 7. The clearing arm 2, which is arranged radially inside in the pressure cone 7, then extends from above by way of its clearing tine 3 through the pressure line 27. When the motor 17 is activated, the clearing member, which is realized as clearing arm 2, is driven rotatably in such a manner that the clearing tine 3 pushes individual particles of bulk material in the discharge direction over the edge 10 of the outlet opening 9. In some examples, the amount of discharged bulk material in the case of the design depends substantially on the speed of the shaft 16, given the bulk material and given the development of the clearing arm 2, the clearing tine 3 and the bottom 6.

The bottom 6, as in the example according to FIG. 1, is implemented as a diffuser bottom 6, reference being made at this point to the description in FIG. 1, the features of which relating to the bottom 6 also being applicable to the example according to FIG. 5. This example design of the bottom, with reference to the pressure height h, produces a profile development between a substantially imaginary maximum pressure height $h_{max}$ outside the circumference of the bottom edge of the pressure cone 7 and a minimum pressure height $h_{min}$ in the vicinity of the edge 10 of the discharge opening 5.

To introduce the fluid flow 22, in this example, the discharge apparatus has additionally on its bottom housing, in particular on a side wall 12, an inlet connecting piece 23 which, for example, is connectable to a hot air or exhaust air line such that warm or hot air for drying, preliminary treatment medium or polluted exhaust air can be introduced as fluid flow below the bottom 6 and the discharge opening 5 into the discharge apparatus. If the inlet connecting piece is mounted below the inclined bottom 11 as in FIG. 5, said inclined bottom has to be implemented at least in part so as to be permeable to the fluid flow 22 or may at least have a passage for the fluid flow 22. However, in some examples, it can also be provided in a deviating manner that the inlet connecting piece 23 is provided above the inclined bottom 11, as a result of which the design of the inclined bottom or alternative removal/conveying apparatus for the discharged bulk material is subject to fewer limitations.

In some examples, the fluid flow 22 introduced through the inlet connecting piece 23 penetrates the discharge bulk material and penetrates at least in part (right-hand part of FIG. 5) or completely (left-hand part of FIG. 5) through the discharge opening 5 into the interior that is defined by the outer surface wall 8 and the bottom 6, (e.g., into a receiving funnel 24 that is formed by the outer surface wall 8 and the bottom 6). For improved introduction into the bulk material, as an alternative to this or in addition to it, in some examples, it can be provided, as indicated in the right-hand part of FIG. 5, that the bottom 6 is implemented at least in portions so as to be permeable to the fluid flow 22. However, in this example, the bottom 6 is preferably implemented so as to be impermeable to the bulk material. To this end, the bottom 6 can have, for example in portions, a perforated sheet with suitable perforation. The bottom preferably includes a suitable perforated sheet, for example.

In the course of penetrating the bulk material with the fluid flow 22 in opposition to the discharge direction of the bulk material, said fluid flow interacts with the bulk material, as a result of which, for example, a drying and/or preliminary treatment process can be effected on the particles of bulk material and/or a conversion process of constituent parts of the fluid flow, such as for example a thermal, chemical and/or mechanical conversion of harmful substances entrained in the fluid flow, for example. In this example, a fluid flow 25, which is modified corresponding to the processes running in the bulk material, is generated from the fluid flow 22, which fluid flow 25 is able to be removed upward through the bulk material container. For this purpose, in some examples, a removal or outlet unit is preferably provided in the bulk material container. If the fluid flow 22 is polluted exhaust air, preferably clean exhaust air, preferably clean gas, is generated in the thermal and/or catalytic cleaning process in the bulk material as the modified fluid flow 25.

If the bulk material is spent, damaged, polluted or the like after successful drying treatment and/or preliminary treatment or as a result of the interaction with the fluid flow 22, it can be discharged successively and in a controlled manner out of the bulk material container or the receiving funnel 24 by the discharge apparatus by activating the rotary drive of the clearing arm 2 and can be conveyed away for further treatment, further processing, cleaning, preparation and/or storage.

Figure 6:
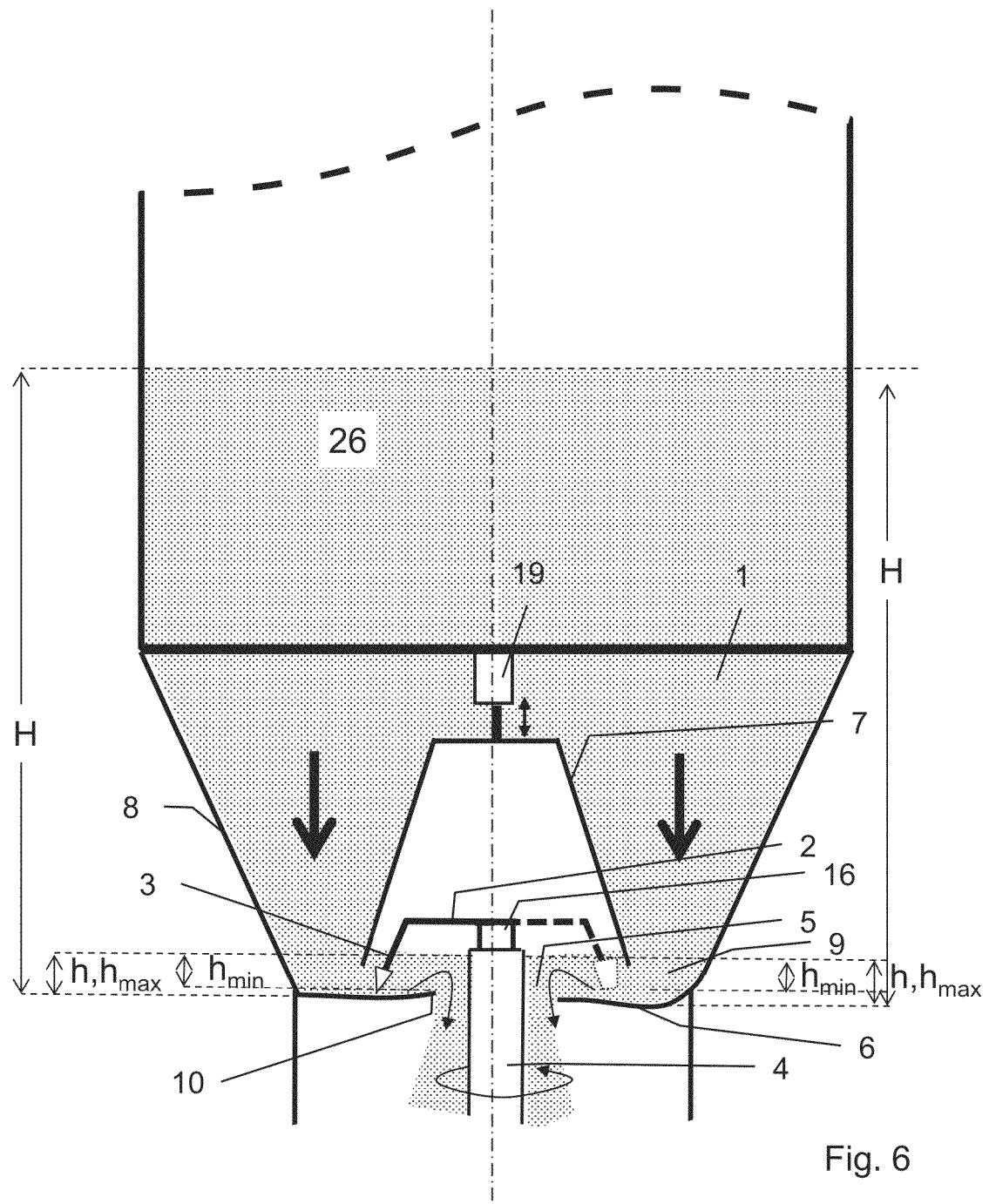
FIG. 6 shows two additional example devices for receiving bulk material, with a bulk material receiving apparatus and a discharge apparatus.

FIG. 6 shows a representation of a detail of two further alternative examples of an example device 1 for receiving bulk material having a bulk material receiving apparatus and having a discharge apparatus in an application analogous to FIG. 5. At this point the modifications undertaken in the case of said device compared to the device shown in FIG. 5 are described. For the rest, reference is made to the description of the device described by way of FIG. 5.

In this example, a clearing member that is implemented as a clearing arm 2 with a spring tine 3 that is provided with a substantially triangular clearing body 20, 20b is indicated on the right-hand side of FIG. 6, while the bottom 6 is implemented as a diffuser bottom 6 with a small undulation initially descending and then ascending toward the edge 10. Once again a clearing member that is implemented as a clearing arm 2 with a clearing tine 3 that is provided with a spade-blade-shaped clearing body 20, 20a is indicated on the left-hand side of FIG. 6, the bottom 6 being implemented as a curved diffuser bottom 6, a substantially flat plateau being integrally molded in the vicinity the edge 10, for example. Here too, there is a maximum pressure height $h_{max}$ outside the circumferential line of the pressure cone 7 and a minimum pressure height $h_{min}$ inside the circumferential line of the pressure cone, it being possible to determine the radial position of the pressure height minimum by the plateau. In further designs, the example according to FIG. 6 corresponds to the example according to FIG. 5 such that with reference to the further features, the method of operation and application, reference is made to the preceding description of the example according to FIG. 5.

Figure 7:
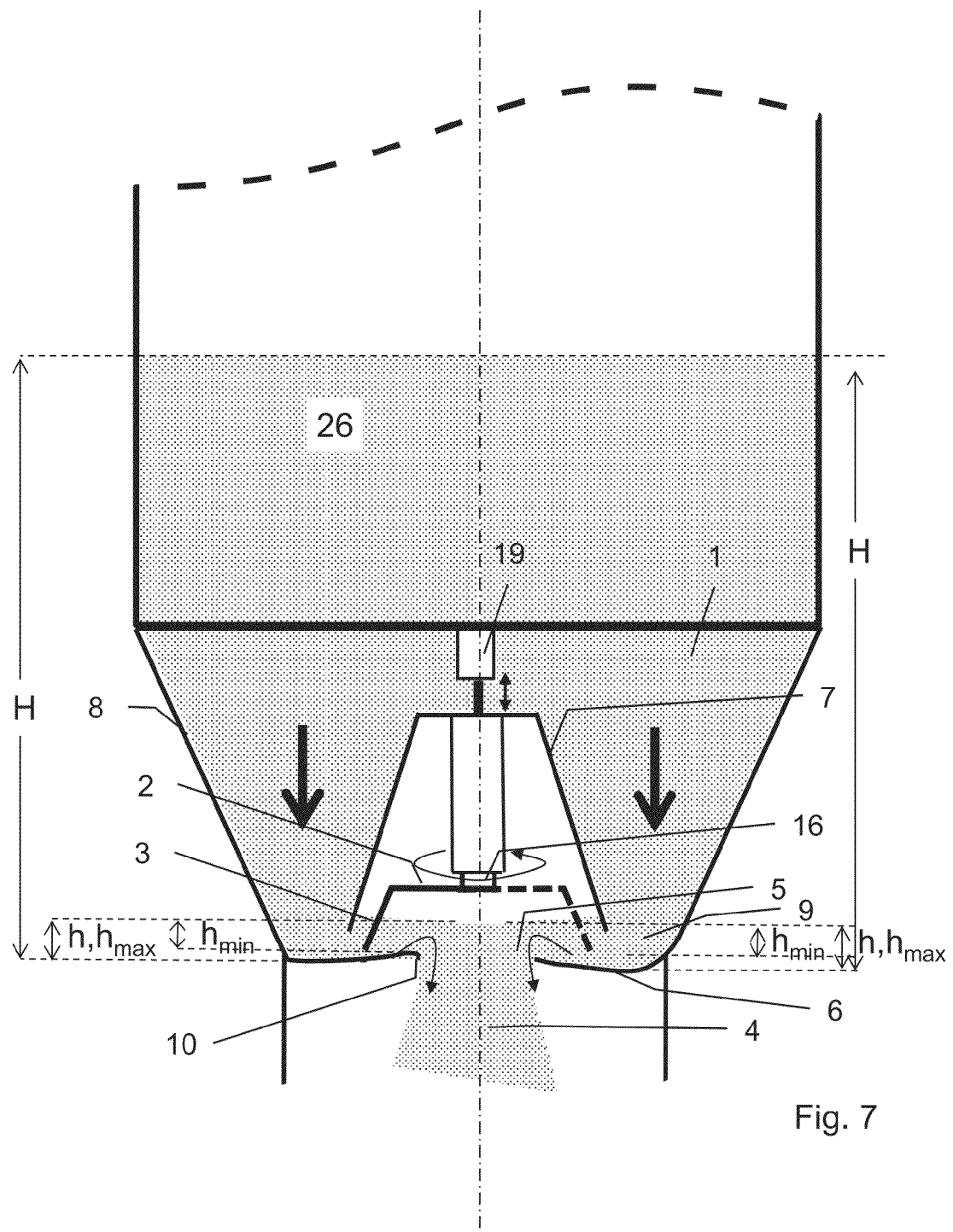
FIG. 7 shows two further example devices for receiving bulk material, with a bulk material receiving apparatus, a discharge apparatus and a rotary drive, arranged in a pressure cone, for a clearing arm.

FIG. 7 shows a representation of a detail of two further alternative examples of a device 1 for receiving bulk material having a bulk material receiving apparatus and having a discharge apparatus in an application analogous to FIG. 5. At this point the modifications are discussed. For the rest, the description with regard to the design and method of operation for FIG. 5 is applicable. Common to both examples shown is that the rotary drive of the shaft 16, and consequently of the clearing arm 2, is not arranged below the discharge opening 5 but in the interior of the pressure cone 7, in particular is connected to the inside surface of the pressure cone 7. As a result, the space below the discharge opening 5 is advantageously freed from any restrictions with regard to the arrangement of conveying and/or other process engineering for the discharged bulk material.

In this example, a clearing arm 2 with a clearing tine 3, in particular a spring tine 3 or a clearing rake 3a is indicated on the right-hand side of FIG. 7, while the bottom 6 is implemented as a diffuser bottom 6 with a small, undulation initially descending and then ascending toward the edge 10, the edge 10 itself being formed in a slightly descending manner. Once again, in this example, a clearing arm 2 with a clearing tine 3, in particular a spring tine 3 or a clearing rake 3a, is indicated on the left-hand side of FIG. 7, the bottom 6 being implemented as a curved diffuser bottom 6 similar to FIG. 1 or FIG. 5. Here too, in both designs, there is a maximum pressure height $h_{max}$ outside the circumferential line of the pressure cone 7 and a minimum pressure height $h_{min}$ inside the circumferential line of the pressure cone. In a further design, the example according to FIG. 7 correspond to the example according to FIG. 5 such that with reference to the further features, the method of operation and application, reference is made to the preceding description of the example according to FIG. 5.

Figure 8:
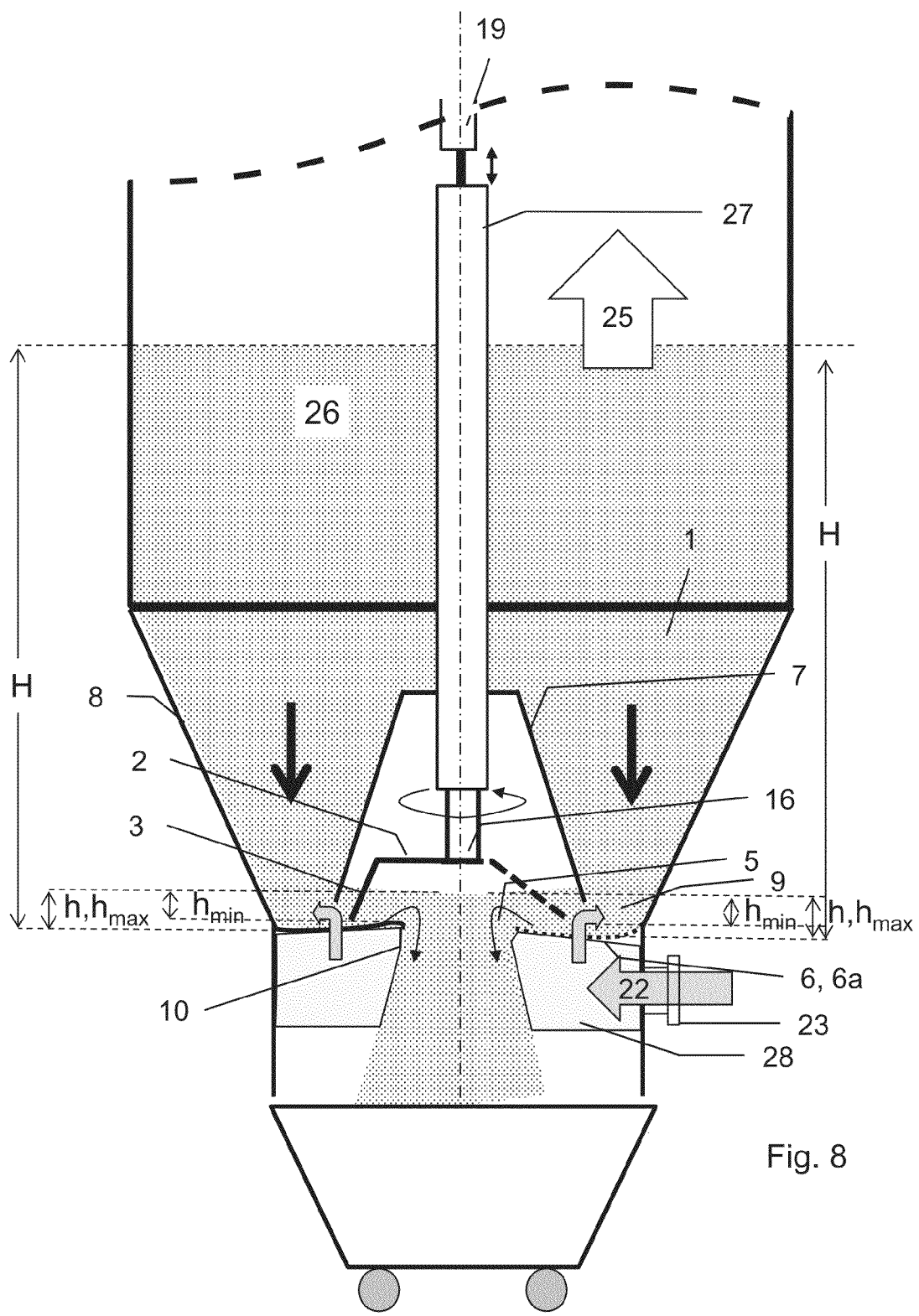
FIG. 8 shows two further example devices for receiving bulk material, with a bulk material receiving apparatus, with a discharge apparatus and a rotary drive for a clearing arm including a shaft that reaches through a bulk material receiving apparatus in a bulk material container.

FIG. 8 shows a representation of a detail of two further alternative examples of a device for receiving bulk material having a bulk material receiving apparatus and having a discharge apparatus in an application analogous to FIG. 5. At this point the modifications undertaken are discussed. For the rest, the description for FIG. 5 is applicable with regard to design and method of operation. Common to both examples is that the rotary drive of the shaft 16, and consequently of the clearing arm 2, is not arranged below the discharge opening 5 but inside a hollow pipe 27 that is guided through the bulk material container and the receiving funnel 24. The pressure cone 7, in this example, is arranged, preferably fastened, on the hollow pipe 27 in an end region of the hollow pipe 27 facing the discharge opening 5. At the same time, both the pressure cone 7 and the clearing arm 2 can be adapted along the discharge direction with regard to an axial height by the lifting apparatus 19 that is arranged at the top in the bulk material container. The lifting apparatus 19 and the rotary drive are able to be positioned outside the bulk material as a result of the long hollow pipe 27. As an alternative to this, it is also conceivable for the lifting apparatus 19 to be arranged on a crossbeam in the receiving funnel 24 in an analogous manner to the example devices described by way of FIG. 1, FIG. 5 and FIG. 6, it then being possible in an advantageous manner for the hollow pipe 27 to be shorter. These measures also make it possible for the space below the discharge opening 5 to be able to be advantageously freed from any restrictions with regard to the arrangement of conveying and/or other process engineering for the discharged bulk material as in the devices described by way of FIG. 7. To this end, as an example, a conveying vehicle is indicated as alternative conveying device in FIG. 8.

In addition, common to the design examples according to FIG. 8 is that the inlet connecting piece 23 for supplying the fluid flow 22 opens out into a ring line 28 that extends below the bottom 6. On its side surface facing the bottom 6, the ring line 22, in this example, has means for blowing, sucking, spraying or enabling the fluid flow 22 into the receiving funnel 24. Said means, in this example, can be, for example, a perforated sheet that corresponds to a fluid-permeable bottom 6 and/or one or several nozzle holes, nozzle channels and the like that reach through the bottom.

In this example, as known from FIG. 1 or 5, a clearing arm 2 with a clearing tine 3, in particular a spring tine 3 or a clearing rake 3a is indicated on the right-hand side of FIG. 8, while the bottom 6 is implemented as a diffuser bottom 6 with a small, undulation initially descending and then ascending toward the edge 10, the edge 10 itself being formed in a slightly descending manner. Nozzle holes, nozzle bores or similar lead-throughs for the fluid 22, which proceed from the ring channel 28, extend through the bottom 6 in this example. Once again an angled clearing arm 2 with a clearing tine 3, in particular a spring tine 3 or a clearing rake 3a, is indicated on the left-hand side of FIG. 8, the bottom 6 being implemented as a curved diffuser bottom 6 with a fluid-permeable portion similar to FIG. 5. Here too, in both designs, there is a maximum pressure height $h_{max}$ outside the circumferential line of the pressure cone 7 and a minimum pressure height $h_{min}$ inside the circumferential line of the pressure cone. In a further design, the example according to FIG. 8 correspond to the example according to FIG. 5 such that with reference to the further features, the method of operation and application, reference is made to the preceding description of the example according to FIG. 5.

Figure 9:
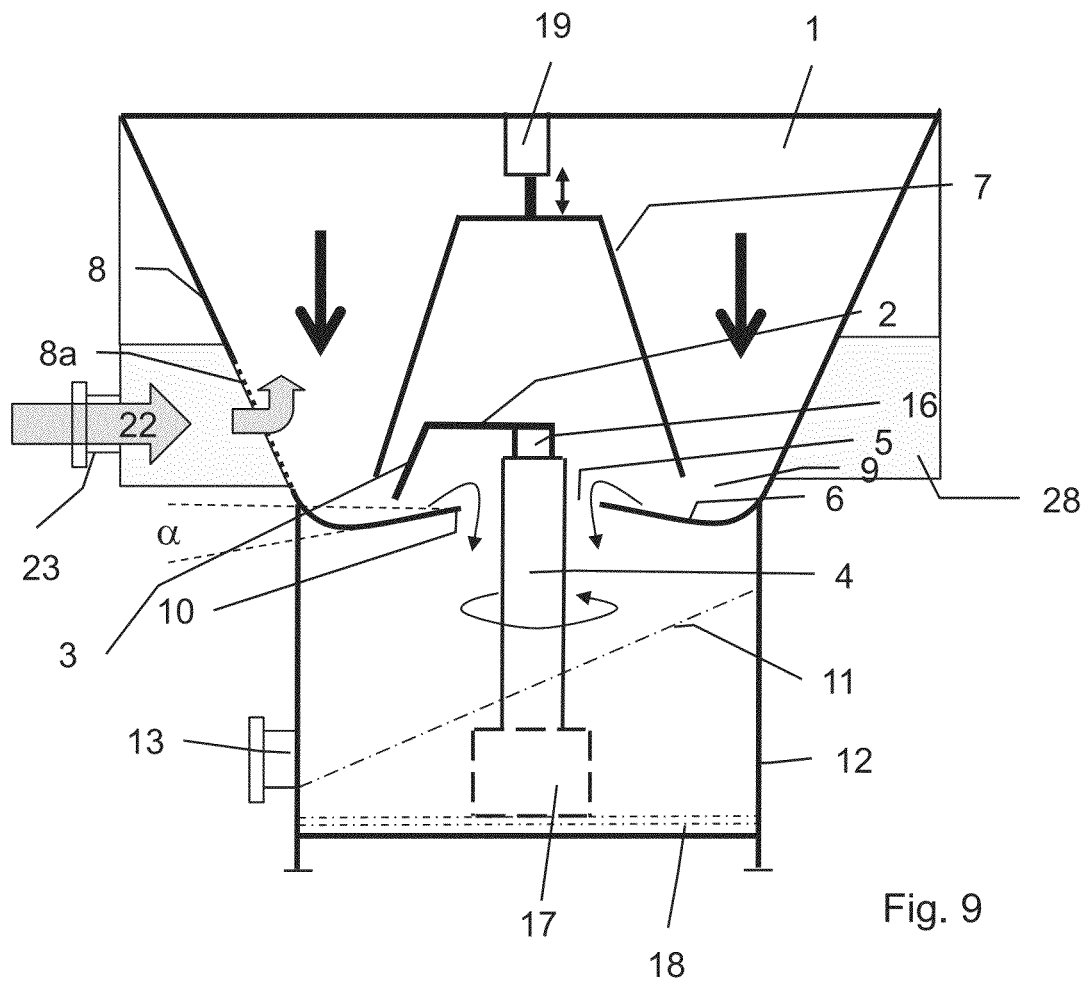
FIG. 9 shows another example device for receiving bulk material, with a funnel-shaped bulk material receiving apparatus that is provided with a casing.

FIG. 9 shows a further example of a example device for receiving bulk material having a bulk material receiving apparatus and having a discharge apparatus similar to the device described by way of example in FIG. 1 or FIG. 5, in said design at least one part portion 8a of the outer surface wall 8 being implemented as a fluid-permeable portion. Said part portion 8a is, in this example, preferably surrounded radially externally by a ring channel 28, at which the inlet connecting piece 23 for supplying the fluid flow 22 is arranged. In a further design, the example according to FIG. 9 corresponds to the example according to FIG. 5 such that with reference to the further features, the method of operation and application, reference is made to the preceding description of the example according to FIG. 5.

Proceeding from the examples described in detail in the preceding passages, the modifications and further developments may be made by combining the features as disclosed herein. Thus, for example, in place of one inlet connecting piece 23 it is conceivable to provide two or more inlet connecting pieces (e.g., 2, 3, 4, etc.), by means of which it is then also possible to introduce different fluid flows 22 into the bulk material. The combination of the different supply or inlet examples into the bulk material such as, for example, through the discharge opening 5, through the floor 6, through the outer surface wall 8 and/or by ring channels 28 or other inlet lines can also produce advantageous combinations. A plurality of variation possibilities regarding the manner of the removal of the discharged bulk material, which are essentially and/or substantially determined by the application of the discharge apparatus, are also possible.

Figure 10:
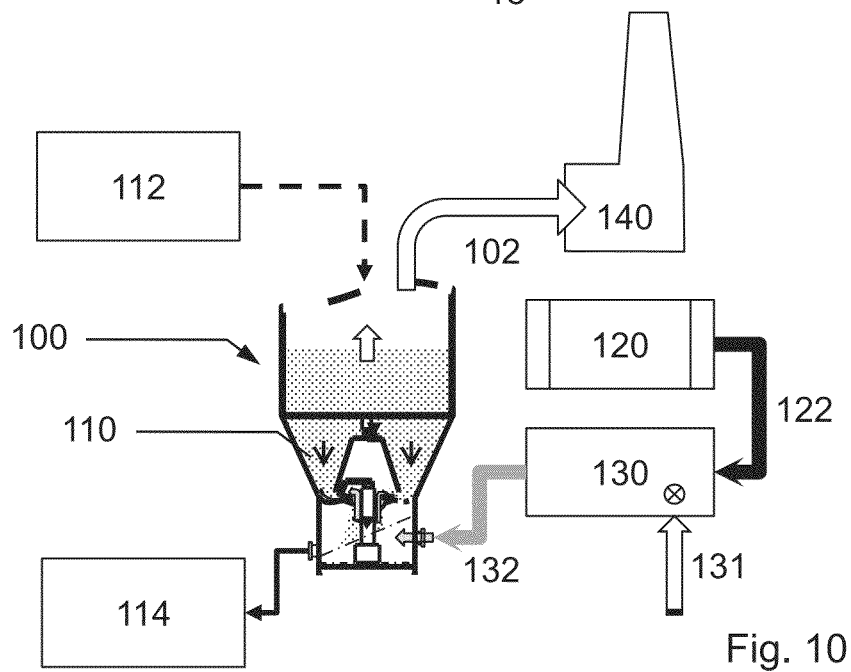
FIG. 10 shows a flow diagram of an example method for the thermal and/or catalytic cleaning of exhaust air.

FIG. 10 shows a schematic flow diagram of an example method for the thermal and/or catalytic cleaning of polluted exhaust air by a bulk material that is receivable in a bulk material container 100 and a discharge apparatus 110. To produce readiness for operation, in this example, in a preparation process 112 suitable bulk material, for example ceramic granular material, ceramic heat storage bodies, catalyst bodies or the like, has to be brought into the bulk material container. As soon as this has been carried out, polluted exhaust air 122 from an operating process 120 can be supplied to a preliminary treatment process, in particular heating process 130. The heating process 130, in this example, can go back to a burner operated with an additionally supplied fuel 131. In a particularly preferred example, the heating process 130 can be effected by a gas turbine installation, in particular a micro-gas turbine that includes a burner, a compressor and a turbine, said gas turbine installation, at the same time, also being able to provide mechanical and/or electric energy. The exhaust air 132, treated preliminarily in this manner, is then supplied by the inlet connecting pieces to the exhaust air cleaning apparatus, which is formed from the discharge apparatus 110 and the bulk material container 100. The preliminarily treated exhaust air 132 is then cleaned by interaction with the bulk material in the manner described in the preceding passages and is preferably forwarded, in some examples, as clean gas 102 to a subsequent process. In the simplified flow diagram according to FIG. 10, the clean gas 102 is released via a pipe 140.

As set forth herein, an example device 1 for receiving bulk material 26 has a bulk material receiving apparatus 1' and includes a discharge apparatus. The bulk material receiving apparatus 1' has a bottom 6 with a discharge opening 5 and has an outer surface wall 8. The discharge apparatus includes, for example, a clearing member, which is implemented in particular as a clearing arm 2 that is mounted on a bearing column 4 so as to be rotatable about a center axis 4' that passes through the discharge opening 5, and a pressure cone 7 that is arranged above the bottom 6. The pressure cone 7 forms a discharge gap 9 with the outer surface wall 8 and the bottom 6. The device includes a drive 17 for the clearing arm 2, by means of which drive the clearing member 2 is able to be rotated about the center axis 4' in an operating direction of rotation 17'. In some examples, at least one clearing tine 3 is fastened on the at least one clearing member 2, said at least one clearing tine dipping into the bulk material 26 received in the bulk material receiving apparatus 1' when the clearing member 2 moves in a rotating manner about the center axis 4' in the operating direction of rotation 17' and pushes the bulk material 26 toward the center axis 4', the bulk material 26 falling through the discharge opening 5 in the bottom 6.

At the same time, in some examples, the pressure cone 7 engages over the clearing member 2. As an alternative to this or in addition to it, the bottom 6 can be implemented as a diffuser bottom that extends ascending to the discharge opening 5. In a preferred manner, in this example, the diffuser bottom 6, which extends ascending to the discharge opening 5, then has a rounding portion and an inclined surface. In some examples, the discharge opening 5 surrounds the bearing column 4 in a ring-shaped manner.

In the case of an example of the device 1, there is a first (outer) and a second (inner) clearing tine fastened on the clearing arm 2 and implemented as a spring tine 3. Said clearing tines are arranged offset with respect to one another in a radial and a vertical manner. They dip into the bulk material 26 received in the bulk material receiving apparatus 1' when the clearing member 2 moves in a rotating manner about the center axis 4' in the operating direction of rotation 17', wherein the outer clearing tine 3 has one end 3' that ends in front of the rounding portion of the diffuser bottom 6 and the inner clearing tine 3 has one end that ends above the inclined surface of the diffuser bottom 6.

In some examples, it is provided that, the at least one clearing tine 3, when the clearing member 2 moves in a rotating manner about the center axis 4', is moved along a circumferential path, along which the spacing A of one bottom end of the clearing tine 3 remote from the center axis 4' is smaller than half the diameter D of the opening of the pressure cone 7 pointing to the discharge opening 5.

The pressure cone 7 can have an axis that is in alignment with the center axis 4'. In a preferred manner, in some examples, the at least one clearing tine 3 is implemented as a spring tine 3a, 3b. Said spring tine 3 can include and/or be made of spring steel. The spring tine 3 has a first curved portion 14, which can be dipped into the bulk material and merges into a second portion 15 that is curved in an arc-shaped manner, is fastened to the clearing member 2 and is extended into the interior of the pressure cone 7. The at least one clearing tine 3 can also be implemented as a clearing rake 3a.

In a preferred manner, in some examples, the clearing arm of the device is fastened on a drive shaft 16 that protrudes out of the bearing column 4. The at least one clearing tine 3 can have at least one clearing body 20 on its end 3' that reaches into the bulk material. It is advantageous when the device includes, in some examples, an inclined bottom 11 with side walls 12 arranged below the discharge opening 5 said inclined bottom opening out into a discharge channel—preferably connectable to a bulk material conveyor—or into a discharge pipe 13—preferably connectable to a bulk material conveyor.

The device can also have several clearing arms 2 with at least one clearing tine 3, said clearing arms being mounted so as to be rotatable on the bearing column 4 and being arranged offset in an azimuthal manner with respect to one another with reference to the center axis 4'. Said several clearing arms 2 can be arranged offset with respect to one another in particular by the azimuth angle α=180° or α=120°.

In some examples, the pressure cone 7 is arranged so as to be vertically adjustable above the bottom 6 and/or that the pressure cone 7 has a closed or a perforated wall.

In some examples, the bulk material receiving apparatus 1' is implemented by tapering in the manner of a funnel in the downwardly pointing direction, preferably tapering in a conical manner, the outer surface wall 8 merging in arc-shaped manner into the diffuser bottom 6. It is possible to realize the outer surface wall 8 of the device in a closed or perforated manner.

The device can be implemented, for example, as a bulk material container or as a bottom part of a bulk material container or as a clearing out apparatus with housing that is movable (e.g., drivable) under a bulk material container for receiving bulk material having a bulk material receiving apparatus and having a discharge apparatus.

An example device as set forth herein can be used in particular in an installation for treating gaseous fluid, in particular in an installation for the thermal and/or catalytic cleaning of polluted exhaust air, in particular of exhaust air that includes silicon-organic compounds. In some examples, a connection 23, which communicates with the bulk material receiving apparatus 1' for supplying the gaseous fluid to be treated is provided on the device to flow through the bulk material receiving apparatus 1' with the supplied gaseous fluid and to act upon bulk material 26 received therein with the gaseous fluid. The gaseous fluid supplied at the connection 23, in this example, is guided into the bulk material receiving apparatus 1' along a flow path that passes through the discharge opening 5 at least in part. In some examples, a device as disclosed herein can be used in an exhaust air cleaning installation, in particular in a thermal and/or catalytic exhaust air cleaning apparatus.

For the discharging of bulk material 26 out of the bulk material receiving apparatus of an example device, the at least one clearing tine 3 is dipped from above along, for example, a circumferential path, into the bulk material 26 received in the bulk material receiving apparatus 1' and is moved about the center axis 4', as a result of which the at least one clearing tine 3 displaces the bulk material 26 and separates the bulk material 26 into single particles and conveys the bulk material 26 over an edge 10 of the bottom 6 into the discharge opening 5.

It is advantageous, in this example, when the at least one clearing tine 3 is moved below the pressure cone 7, wherein the pressure cone 7 sets a pressure height $h_{min} \leq h \leq h_{max}$ which decreases in the direction pointing to the center axis 4' for the bulk material 26 received in the bulk material receiving apparatus 1'. This can be achieved in particular as a result of the diameter of the circumferential path being greater than the diameter of the opening of the pressure cone 7 pointing to the discharge opening 5.

To treat gaseous fluid using a device as disclosed herein, in particular in order to use the device to clean exhaust air loaded with harmful substances, in particular exhaust air that includes silicon-organic compounds, in a thermal and/or catalytic manner, the bulk material receiving apparatus 1' is filled with a ceramic granular material, a ceramic heat storage body, a catalyst body or the like, but also with a particle-shaped material containing calcium and/or carbon as bulk material 26, for example. In some examples, the gaseous fluid to be treated is supplied into the bulk material container 1, the bulk material 26 in the bulk material container 1 being acted upon with the supplied gaseous fluid and at the same time being discharged out of the bulk material receiving apparatus 1'.

In some examples, the examples set forth herein also relate to a discharge apparatus for a bulk material container 1 having at least one clearing arm 2, which, in its operating position, carries out a rotational movement about the center axis of the bulk material container 1 in the operating direction of rotation by a drive and at the same and/or the substantially same time, by a clearing tine 3 fastened thereon, pushes the bulk material out of the bottom region of the discharge apparatus toward the bearing column 4 of the clearing arm 2. In some examples, the bulk material falls into the bottom 6 through a discharge opening 5, which surrounds the bearing column 4 in a ring-shaped manner, and having a pressure cone 7 that is arranged centrally above the bottom 6 and forms a discharge gap 9 with the outer surface wall 8 of the bulk material container 1 and the bottom 6. In some examples, the bottom 6 is implemented as a diffuser bottom that extends in an ascending manner to the discharge opening 5, that the clearing tine 3 is a spring tine and is arranged extending inside the pressure cone 7 and dips from above into the bulk material and ends above the diffuser bottom 6 and is implemented in such a manner that the pressure cone 7 conveys individual bulk material over the edge 10 of the diffuser bottom 6 into the discharge opening 5, and that below the discharge opening 5 there is arranged an inclined bottom 11 with side walls 12, which opens out into a discharge channel or into a discharge pipe 13.

In some examples, the geometric design of the wall angle (α) and of the radii of the diffuser bottom 6 as well as of the clearing tines 3 is matched to the bulk material to be discharged.

In some examples, the spring tine 3 includes and/or is made of spring steel and has a portion 14 that dips into the bulk material, is implemented in a curved manner and is an extension of an arc-shaped, ring-shaped metal part 15 that extends upright into the pressure cone and is fastened on the clearing arm 2 and said clearing arm is fastened on the drive shaft 16 that protrudes out of the bearing column 4. Additionally or alternatively, two spring tines 3 dip into the bulk material in pairs. In some examples, the arrangement is provided so as to be radially and vertically offset in such a manner that the end of the outer spring tine 3 ends in front of the rounding part of the diffuser bottom 6, while the end of the inner spring tine 3 ends above the inclined surface of the diffuser bottom 6.

Several spring tines can be arranged on the shaft distributed along the circumferential path, in particular offset by 180° or 120°.

The pressure cone 7 can be arranged so as to be vertically adjustable in the discharge apparatus or in the bulk material container 1 and has a closed or a perforated wall. In some examples, the outer surface wall 8 of the discharge apparatus or of the bulk material container 1 is implemented by tapering downwards in a conical manner, merges in an arc-shaped manner into the diffuser bottom 6 and is implemented in a closed or perforated manner. The discharge channel or the discharge pipe 13 can be connectable, in this example, to a bulk material conveyor.

As set forth herein, an example device 1 for receiving bulk material 26 is disclosed where said device includes a bulk material receiving apparatus and/or means (1') and having a discharge apparatus. The bulk material receiving apparatus 1' has a bottom 6 with a discharge opening 5 and has an outer surface wall 8. The discharge apparatus includes at least one clearing member 2 that is mounted on a bearing column 4 so as to be rotatable about a center axis 4' that passes through the discharge opening 5 and one pressure cone 7 that is arranged above the bottom 6 and forms a discharge gap 9 with the outer surface wall 8 and/or the bottom 6. The discharge apparatus additionally includes a drive 17 for the clearing member 2, by way of which the clearing member 2 is able to be rotated about the center axis 4' in an operating direction of rotation 17'. At least one clearing tine 3 is fastened on the at least one clearing member 2 where the clearing tine dips into the bulk material 26 received in the bulk material receiving apparatus 1' when the clearing member 2 moves in a rotating manner about the center axis 4' in the operating direction of rotation 17' and pushing the bulk material 26 toward the center axis 4'. The bulk material 26 falls from the bottom 6 through the discharge opening 5 and the pressure cone 7 engages over the clearing member 2.

In some examples, the bottom is implemented as a diffuser bottom 6 that extends ascending to the discharge opening 5.

In some examples, the device 1 for receiving bulk material 26 includes a bulk material receiving apparatus 1' having a discharge apparatus. The bulk material receiving apparatus 1' has a bottom 6 with a discharge opening 5 and has an outer surface wall 8. The discharge apparatus includes at least one clearing member 2 that is mounted on a bearing column 4 so as to be rotatable about a center axis 4' that passes through the discharge opening 5 and one pressure cone 7 that is arranged above the bottom 6 and forms a discharge gap 9 with the outer surface wall 8 and/or the bottom 6. In some examples, the discharge apparatus additionally includes a drive 17 for the clearing member 2, by way of that the clearing member 2 is able to be rotated about the center axis 4' in an operating direction of rotation 17'. In some examples, at least one clearing tine 3 is fastened on the at least one clearing member 2 where the clearing tine dips into the bulk material 26 received in the bulk material receiving apparatus 1' when the clearing member 2 is moved in a rotating manner about the center axis 4' in the operating direction of rotation 17' and pushes the bulk material 26 toward the center axis 4'. In some examples, the bulk material 26 falls from the bottom 6 through the discharge opening 5. The bottom 6 is implemented as a diffuser bottom that extends ascending to the discharge opening 5.

In some examples, the diffuser bottom 6, which extends ascending to the discharge opening 5, has a rounding portion and an inclined surface.

In some examples, a first (outer) and a second (inner) clearing tine fastened on the clearing member 2 is implemented as a spring tine 3, which are arranged offset relative to one another in a radial and vertical manner. In some examples, when the clearing member 2 moves in a rotating manner about the center axis in the operating direction of rotation 17', the clearing tines dip into the bulk material received in the bulk material receiving apparatus 1'. In some examples, the outer clearing tine 3 has one end 3', which ends in front of the rounding portion of the diffuser bottom (6), and the inner clearing tine 3 has one end that ends above the inclined surface of the diffuser bottom 6.

In some examples, the discharge opening 5 surrounds the bearing column 4 in a ring-shaped manner.

In some examples, when the clearing member 2 moves in a rotating manner about the center axis 4', the at least one clearing tine 3 is moved along a circumferential path, along which the distance (A) of one bottom end of the clearing tine 3 remote from the center axis 4' is smaller than half the diameter (D) of the opening of the pressure cone 7 pointing to the discharge opening 5.

In some examples, the pressure cone 7 has an axis that is in alignment with the center axis 4'.

In some examples, at least one clearing tine 3 is implemented as a spring tine.

In some examples, the spring tine 3 includes and/or is made of spring steel and has a first curved portion 14 fastened to the clearing member 2 and is extended into the interior of the pressure cone 7. In some examples, the first curved portion 14 can be dipped into the bulk material and merges into a second portion 15 that is curved in an arc-shaped manner.

In some examples, the at least one clearing tine 3 is a clearing rake 3a.

In some examples, the clearing member is fastened on a drive shaft 16 that protrudes out of the bearing column 4.

In some examples, the at least one clearing tine 3 has at least one clearing body 20 on its end 3' that reaches into the bulk material.

In some examples, an inclined bottom 11 with side walls 12 arranged below the discharge opening 5 includes an inclined bottom opening out into a discharge channel—preferably connectable to a bulk material conveyor—or into a discharge pipe 13—preferably connectable to a bulk material conveyor.

In some examples, the clearing member is implemented as a clearing arm 2.

In some examples, several clearing arms 2 with at least one clearing tine 3 wherein the clearing arms are mounted so as to be rotatable on the bearing column 4 and arranged offset in an azimuthal manner with respect to one another with reference to the center axis 4'.

In some examples, the several clearing arms 2 are arranged offset with respect to one another by the azimuth angle $\alpha=180°$ or $\alpha=120°$.

In some examples, the pressure cone 7 is arranged so as to be vertically adjustable above the bottom 6 and/or in that the pressure cone 7 has a closed or a perforated wall.

In some examples, the bulk material receiving apparatus 1' is implemented tapering in the manner of a funnel in the downwardly pointing direction, preferably tapering in a conical manner and the outer surface wall 8 merges in arc-shaped manner into the diffuser bottom 6.

In some examples, the outer surface wall 8 is implemented in a closed or perforated manner.

An example device that is configured as a bulk material container or as a bottom part of a bulk material container or as a clearing out apparatus with housing that is movable—in particular drivable—under a bulk material container as disclosed herein.

An installation for treating gaseous fluid, in particular for the thermal and/or catalytic cleaning of polluted exhaust air, in particular of exhaust air that includes organic-silicon compounds as disclosed herein where the device has a connection 23 that communicates with the bulk material receiving apparatus 1' for supplying the gaseous fluid to be treated in order to flow through the bulk material receiving apparatus 1' with the gaseous fluid and to act upon bulk material 26 received therein with the gaseous fluid.

The installation as set forth herein includes gaseous fluid supplied at the connection 23 is guided into the bulk material receiving apparatus 1' along a flow path that passes through the discharge opening 5 at least in part.

The use of a device for receiving bulk material 26 having a bulk material receiving apparatus and having a discharge apparatus in an exhaust air cleaning installation, in particular in a thermal and/or catalytic exhaust air cleaning apparatus.

The use as disclosed herein in which the cleaning of exhaust air including silicon-organic compounds.

An example method for discharging bulk material 26 out of a bulk material receiving apparatus 1' by a discharge apparatus where the bulk material receiving apparatus 1' has a bottom 6 with a discharge opening 5 and has an outer surface wall 8. In some examples, the discharge apparatus includes at least one clearing tine 3, which is mounted so as to be rotatable about a center axis 4' that passes through the discharge opening 5, and one pressure cone 7 that is arranged above the bottom 6 forms a discharge gap 9 with the outer surface wall 8 and/or the bottom 6. In some examples, the clearing tine 3 dips into the bulk material 26 and is moved along a circumferential path about the center axis 4', as a result of which the clearing tine 3 conveys the bulk material 26 to the discharge opening 5.

In some examples, the at least one clearing tine 3 is moved below the pressure cone 7. In some examples, the pressure cone 7 sets a pressure height (hmin≤h≤hmax), which decreases in the direction pointing to the center axis 4', for the bulk material 26 received in the bulk material receiving apparatus 1'.

In some examples, the diameter of the circumferential path is greater than the diameter of the opening of the pressure cone 7 pointing to the discharge opening 5.

An example method for treating gaseous fluid, in particular for the thermal and/or catalytic cleaning of polluted exhaust air, in particular of exhaust air that includes silicon-organic compounds, characterized by the following processes: prepare a device having a bulk material receiving apparatus 1' that is filled with ceramic granular material, a ceramic heat storage body, a catalyst body and a particle-shaped bulk material 26 containing calcium and/or carbon; and/or supply gaseous fluid to be treated into the bulk material container 1 and act upon the bulk material 26 in the bulk material container 1 with the supplied gaseous fluid at the same time as discharging the bulk material 26 out of the bulk material receiving apparatus 1'.

An example discharge apparatus for a bulk material container 1 having at least one clearing arm 2, which, in its operating position, carries out a rotational movement about the center axis of the bulk material container 1 in the operating direction of rotation by a drive and at the same time, by a clearing tine 3 fastened thereon, pushes the bulk material out of the bottom region of the discharge apparatus toward the bearing column 4 of the clearing arm 2. In some examples, the bulk material falls through a discharge opening 5, which surrounds the bearing column 4 in a ring-shaped manner, into the bottom 6, and having a pressure cone 7 that is arranged centrally above the bottom 6 and forms a discharge gap 9 with the outer surface wall 8 of the bulk material container 1 and the bottom 6. In some examples, the bottom 6 is implemented as a diffuser bottom extending in an ascending manner to the discharge opening 5, in that the clearing tine 3 is a spring tine and is arranged extending inside the pressure cone 7 and dips from above into the bulk material and ends above the diffuser bottom 6 and is implemented in such a manner that the pressure cone 7 conveys individual bulk material over the edge 10 of the diffuser bottom 6 into the discharge opening 5, and in that below the discharge opening 5 there is arranged an inclined bottom 11 with side walls 12, which opens out into a discharge channel or into a discharge pipe 13.

In some examples, the geometric design of the wall angle ($\alpha$) and of the radii of the diffuser bottom 6 as well as of the clearing tines 3 is matched to the bulk material to be discharged.

In some examples, the spring tine 3 includes and/or is made of spring steel and has a portion 14 that dips into the bulk material and is implemented in a curved manner and is an extension of an arc-shaped, ring-shaped metal part 15 that extends upright into the pressure cone and is fastened on the clearing arm 2 and said clearing arm is fastened on the drive shaft 16 that protrudes out of the bearing column 4.

In some examples, two spring tines 3 dip into the bulk material in pairs where the arrangement is provided so as to be radially and vertically offset in such a manner that the end of the outer spring tine 3 ends in front of the rounding part of the diffuser bottom 6, while the end of the inner spring tine 3 ends above the inclined surface of the diffuser bottom 6.

In some examples, several spring tines are arranged on the shaft distributed along the circumferential path, in particular offset by 180° or 120°.

In some examples, the pressure cone 7 is arranged so as to be vertically adjustable in the discharge apparatus or in the bulk material container 1 and has a closed or a perforated wall.

In some examples, the outer surface wall 8 of the discharge apparatus or of the bulk material container 1 is implemented by tapering downwards in a conical manner, merges in an arc-shaped manner into the diffuser bottom 6 and is implemented in a closed or perforated manner.

In some examples, the discharge channel or the discharge pipe 13 is connectable to a bulk material conveyor.

From the foregoing, it will appreciate that the above disclosed methods, apparatus and articles of manufacture relate to an example device for receiving bulk material includes a bulk material receiving apparatus 1' and a discharge apparatus. In some examples, the bulk material receiving apparatus 1' has a bottom 6 with a discharge opening 5 and has an outer surface wall 8. In some examples, the discharge apparatus includes a clearing member 2, which is mounted on a bearing column 4 so as to be rotatable about a center axis 4' that passes through the discharge opening 5, and the pressure cone 7 that is arranged above the bottom 6.

In some examples, the pressure cone 7 forms a discharge gap 9 with the outer surface wall 8 and/or the bottom 6. In some examples, the device includes a drive 17 for the clearing member 2, by way of which the clearing arm 2 is able to be rotated about the center axis 4' in an operating direction of rotation 17'. In some examples, at least one clearing tine 3 is fastened on the at least one clearing member 2 where the clearing tine dips into the bulk material 26 received in the bulk material receiving apparatus 1' when the clearing member 2 is moved in a rotating manner about the center axis 4' in the operating direction of rotation 17' and pushes the bulk material 26 toward the center axis 4'. In some examples, the bulk material 26 falls from the bottom 6 through the discharge opening 5. In some examples, the pressure cone 7 engages over the clearing arm 2.

Additionally or alternatively, in some examples, the bottom 6 can be implemented as a diffuser bottom that extends ascending toward the discharge opening (5). In some examples, the example device for receiving bulk material, relates to a device having a bulk material receiving means (1') and including a discharge apparatus. In some examples, the bulk material receiving means (1') has a bottom (6) with a discharge opening (5) and has an outer surface wall (8). The discharge apparatus includes a clearing member (2), which is mounted on a bearing column (4) so as to be rotatable about a center axis (4') that passes through the discharge opening (5), and one pressure cone (7) that is arranged above the bottom (6).

In some examples, the pressure cone (7) forms a discharge gap (9) with the outer surface wall (8) and/or the bottom (6). In some examples, the device includes a drive (17) for the clearing member (2), by way of which the clearing arm (2) is able to be rotated about the center axis (4') in an operating direction of rotation (17'). At least one clearing tine (3) is fastened on the at least one clearing member (2), said clearing tine dipping into the bulk material (26) received in the bulk material receiving means (1') when the clearing member (2) is moved in a rotating manner about the center axis (4') in the operating direction of rotation (17') and pushing the bulk material (26) toward the center axis (4'), wherein the bulk material (26) falls from the bottom (6) through the discharge opening (5). As set forth herein, the pressure cone (7) engages over the clearing arm (2). Additionally or alternatively, in some examples, the bottom (6) can be realized as a diffuser bottom that extends ascending toward the discharge opening (5).

It is noted that this patent claims priority from International Patent Application No. PCT/EP2013/066340 which was filed on Aug. 2, 2013, which claims priority to German Patent Application No. 20 2012 102 931.3 which was filed on Aug. 8, 2012, both of which are hereby incorporated herein by reference in there entireties.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A device for receiving bulk material, comprising:
    a bulk material receiving apparatus, wherein the bulk material receiving apparatus comprising an outer surface wall and a bottom with a discharge opening; and
    a discharge apparatus comprising a clearing member and a pressure cone, wherein the clearing member is mounted on a bearing column to enable rotation about a center axis that passes through the discharge opening, wherein the pressure cone is arranged above the bottom to form a discharge gap with the outer surface wall or the bottom, wherein the discharge apparatus comprises a drive to rotate the clearing member about the center axis, and
    wherein a clearing tine is coupled to the clearing member, wherein the clearing tine is to dip into bulk material to be received in the bulk material receiving apparatus when the clearing member is rotated about the center axis to push the bulk material toward the center axis, wherein the bulk material is to fall from the bottom through the discharge opening, the clearing tine includes a spring tine including a curved portion, the curved portion to provide a biasing force to the spring tine.

2. The device of claim 1, wherein a first clearing tine and a second clearing tine are coupled to the clearing member and comprise a spring tine, wherein the first and second clearing tines are radially and vertically offset relative to one another.

3. The device of claim 2, wherein the bottom comprises a diffuser bottom, the first clearing tine comprises an end adjacent a rounding portion of the diffuser bottom, and the second clearing tine comprises an end adjacent an inclined surface of the diffuser bottom.

4. The device of claim 2, wherein, when the clearing member rotates about the center axis, the first and second clearing tines are to dip into the bulk material received in the bulk material receiving apparatus.

5. The device of claim 1, wherein, when the clearing member rotates about the center axis, the clearing tine is moved along a circumferential path.

6. The device of claim 1, wherein the bottom comprises a diffuser bottom that ascendingly extends to the discharge opening.

7. The device of claim 1, wherein the bottom comprises a diffuser bottom, the diffuser bottom comprises a rounding portion and an inclined surface.

8. A device for receiving bulk material, comprising:
    a bulk material receiving apparatus, wherein the bulk material receiving apparatus comprising an outer surface wall and a bottom with a discharge opening, wherein the bottom comprises a diffuser bottom that ascendingly extends to the discharge opening; and
    a discharge apparatus comprising a clearing member and a pressure cone, wherein the clearing member is mounted on a bearing column to enable rotation about a center axis that passes through the discharge opening, wherein the pressure cone is arranged above the bottom to form a discharge gap with the outer surface wall or the bottom, wherein the discharge apparatus comprises a drive to rotate the clearing member about the center axis, and
    wherein a clearing tine is coupled to the clearing member, wherein the clearing tine is to dip into bulk material to be received in the bulk material receiving apparatus when the clearing member is rotated about the center axis to push the bulk material toward the center axis, wherein the bulk material is to fall from the bottom through the discharge opening, wherein, when the clearing member rotates about the center axis, the clearing tine is moved along a circumferential path.

9. The device of claim 8, wherein the clearing tine comprises a spring tine.

10. The device of claim 9, wherein the spring tine comprises spring steel, the spring tine comprises a first curved portion and a second portion, the first curved portion is to be dipped into the bulk material, the first curved portion is coupled to the second portion, the second portion comprises a curved-arc-shape, the second portion is to be coupled to the clearing member and is to extend into an interior of the pressure cone.

11. A device for receiving bulk material, comprising:
    a bulk material receiving apparatus, wherein the bulk material receiving apparatus comprising an outer surface wall and a bottom with a discharge opening; and
    a discharge apparatus comprising a clearing member and a pressure cone, wherein the clearing member is mounted on a bearing column to enable rotation about a center axis that passes through the discharge opening, wherein the pressure cone is arranged above the bottom to form a discharge gap with the outer surface wall or the bottom, wherein the discharge apparatus comprises a drive to rotate the clearing member about the center axis, and
    wherein a clearing tine is coupled to the clearing member, wherein the clearing tine is to dip into bulk material to be received in the bulk material receiving apparatus when the clearing member is rotated about the center axis to push the bulk material toward the center axis, wherein the bulk material is to fall from the bottom through the discharge opening, wherein the clearing tine comprises a spring tine, wherein the spring tine comprises spring steel, the spring tine comprises a first curved portion and a second portion, the first curved portion is to be dipped into the bulk material, the first curved portion is coupled to the second portion, the second portion comprises a curved-arc-shape, the second portion is to be coupled to the clearing member and is to extend into an interior of the pressure cone.

12. The device of claim 11, wherein the clearing tine comprises a clearing rake.

13. The device of claim 11, wherein the bottom comprises a diffuser bottom that ascendingly extends to the discharge opening.

14. A device for receiving bulk material, comprising:
a bulk material receiving apparatus comprising an outer surface wall and a bottom with a discharge opening; and
a discharge apparatus comprising a clearing member and a pressure cone, the clearing member is to be mounted on a bearing column to enable rotation about a central axis that passes through the discharge opening, the pressure cone is spaced from the bottom to form a discharge gap between the pressure cone and the outer surface wall or the bottom, wherein the discharge apparatus comprises a drive to rotate the clearing member about a center axis, wherein a clearing tine is coupled to the clearing member, the clearing tine is to dip into bulk material received in the bulk material receiving apparatus when the clearing member rotates about the center axis and pushes the bulk material toward the center axis, wherein the bulk material is to fall from the bottom through the discharge opening, wherein a dimensional envelope of the pressure cone surrounds the clearing member.

15. The device of claim 14, wherein the discharge opening surrounds the bearing column in a ring-shaped manner.

16. The device of claim 14, wherein, when the clearing member rotates about the center axis, the clearing tine is moved along a circumferential path.

17. The device of claim 14, wherein the pressure cone comprises an axis that is aligned with the center axis.

18. The device of claim 14, wherein the clearing member is to be coupled to a drive shaft that is to protrude from the bearing column.

19. The device of claim 14, wherein the clearing tine comprises a clearing body adjacent an end of the clearing tine, the clearing body is to reach into the bulk material.

20. A device for receiving bulk material, comprising:
a bulk material receiving apparatus comprising an outer surface wall and a bottom with a discharge opening; and
a discharge apparatus comprising a clearing member and a pressure cone, the clearing member is to be mounted on a bearing column to enable rotation about a central axis that passes through the discharge opening, the pressure cone is spaced from the bottom to form a discharge gap between the pressure cone and the outer surface wall or the bottom, wherein the discharge apparatus comprises a drive to rotate the clearing member about a center axis, wherein a clearing tine is coupled to the clearing member, the clearing tine is to dip into bulk material received in the bulk material receiving apparatus when the clearing member rotates about the center axis and pushes the bulk material toward the center axis, wherein the bulk material is to fall from the bottom through the discharge opening, wherein the pressure cone engages over or surrounds the clearing member and/or wherein a dimensional envelope of the pressure cone surrounds the clearing member, and
an inclined bottom with side walls below the discharge opening, the inclined bottom is to open out into a discharge channel.

21. The device of claim 14, wherein the clearing member comprises a first clearing arm.

22. The device of claim 21, further comprising a second clearing arm comprising a second clearing tine, the second clearing arm is rotatable on the bearing column, the second clearing arm is offset relative to the first clearing arm.

23. The device of claim 14, wherein the pressure cone is vertically adjustable relative to the bottom.

24. The device of claim 14, wherein the pressure cone comprises a closed wall or a perforated wall.

25. The device of claim 14, wherein the bottom comprises a diffuser bottom, the outer surface wall is tapered and merges into the diffuser bottom.

26. The device of claim 25, wherein the outer surface wall comprises a closed wall or perforated wall.

27. A device of claim 14, wherein the device comprises a thermal or catalytic exhaust air cleaning apparatus.

28. An apparatus for treating gaseous fluid, comprising: the device of claim 14, wherein the device comprises a connection in communication with the bulk material receiving apparatus to supply gaseous fluid to be treated, the gaseous fluid to flow through the bulk material receiving apparatus and to act upon bulk material to be received therein.

29. The apparatus of claim 28, wherein the gaseous fluid supplied to the connection is guided into the bulk material receiving apparatus along a flow path that is to at least partially pass through the discharge opening.

30. The apparatus of claim 28, wherein the gaseous fluid comprises exhaust air including silicon-organic compounds.

31. The device of claim 14, wherein the bearing column is to extend through the discharge opening, the bearing column having an end to engage a device bottom of the device.

* * * * *